US008842560B2

(12) United States Patent
Das et al.

(10) Patent No.: US 8,842,560 B2
(45) Date of Patent: Sep. 23, 2014

(54) USING PARKED MODE TO EXTEND CLIENT SETS IN FEMTO-PROXY ARCHITECTURES

(75) Inventors: Soumya Das, San Diego, CA (US); Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 716 days.

(21) Appl. No.: 12/883,560

(22) Filed: Sep. 16, 2010

(65) Prior Publication Data

US 2012/0069801 A1    Mar. 22, 2012

(51) Int. Cl.
*H04L 12/26* (2006.01)
*H04W 84/04* (2009.01)
*H04W 36/22* (2009.01)
*H04W 36/04* (2009.01)

(52) U.S. Cl.
CPC ........... *H04W 84/045* (2013.01); *H04W 36/04* (2013.01); *Y02B 60/50* (2013.01); *H04W 36/22* (2013.01)
USPC .......... 370/252; 370/254; 370/400; 370/437; 370/450; 455/41.2; 455/421; 455/444

(58) Field of Classification Search
None
See application file for complete search history.

(56) References Cited

U.S. PATENT DOCUMENTS

| 2004/0136338 | A1* | 7/2004 | Lin et al. | 370/329 |
| 2004/0219955 | A1* | 11/2004 | daCosta | 455/574 |
| 2006/0116075 | A1* | 6/2006 | Gallo | 455/41.2 |
| 2009/0156213 | A1* | 6/2009 | Spinelli et al. | 455/436 |
| 2009/0163216 | A1 | 6/2009 | Hoang et al. | |
| 2009/0219844 | A1 | 9/2009 | Soliman | |
| 2009/0221261 | A1 | 9/2009 | Soliman | |
| 2009/0248913 | A1 | 10/2009 | Salokannel | |
| 2009/0288145 | A1 | 11/2009 | Huber et al. | |
| 2009/0298470 | A1* | 12/2009 | Huber et al. | 455/411 |
| 2010/0029278 | A1* | 2/2010 | Fang et al. | 455/436 |
| 2010/0273417 | A1* | 10/2010 | Tian et al. | 455/41.2 |

FOREIGN PATENT DOCUMENTS

| JP | 2006511116 A | 3/2006 |
| WO | 2004056052 | 7/2004 |
| WO | WO-2009125208 A1 | 10/2009 |

OTHER PUBLICATIONS

"Interoperability Specification (IOS) for Femtocell Access Points", 3GPP2 A.S0024-A v1.0, Mar. 2010.*

(Continued)

*Primary Examiner* — Andrew Chriss
*Assistant Examiner* — Salvador E Rivas
(74) *Attorney, Agent, or Firm* — Jeffrey D. Jacobs

(57) ABSTRACT

Systems, methods, devices, and computer program products are described for handling of access terminals on an out-of-band piconet within a femto-proxy architecture. A femto-proxy system includes a femtocell (a femto access point, or FAP) and one or more out-of-band (OOB) proxies. One of the OOB proxies is configured to act as a master of an OOB piconet, through which various services are provided, including services to support the femtocell operation of the femto-proxy system. For example, the OOB piconet is used to facilitate lower power access to the macro communications services provided through the femtocell. In some cases, a combination of connected and inactive OOB operational modes are used to support an expanded number of slave access terminals on the piconet, where some of those slaves are operating in an active WWAN mode and others are operating in an idle WWAN mode. For example, parked mode may be used for idle WWAN mode access terminals.

41 Claims, 11 Drawing Sheets

(56) References Cited

OTHER PUBLICATIONS

Knisely et al., "Standardization of Femtocells in 3GPP" Femtocell Wireless Communications, IEEE Communications Magazine, Sep. 2009, pp. 68-75.
Knisely et al., "Standardization of Femtocells in 3GPP2" Femtocell Wireless Communications, IEEE Communications Magazine, Sep. 2009, pp. 76-82.
Das, Soumya, U.S. Appl. No. 12/861,616 entitled, "Proximity Agent Based Out of Band Communication for Femtocell Operation", filed Aug. 23, 2010.
International Search Report and Written Opinion—PCT/US2011/051814—ISA/EPO—Jan. 3, 2012.

* cited by examiner

USING PARKED MODE TO EXTEND CLIENT SETS IN FEMTO-PROXY ARCHITECTURES

BACKGROUND

The disclosure relates generally to network communication and, more particularly, to extending the client set size for an out-of-band piconet, for example, in a femto-proxy architecture context.

Information communication provided by various forms of networks is in wide use in the world today. Networks having multiple nodes in communication using wireless and wireline links are used, for example, to carry voice and/or data. The nodes of such networks may be computers, personal digital assistants (PDAs), phones, servers, routers, switches, multiplexers, modems, radios, access points, base stations, etc. Many client device nodes (also referred to as user equipment (UE) or access terminals (ATs)), such as cellular phones, PDAs, laptop computers, etc. are mobile and thus may connect with a network through a number of different interfaces.

For example, mobile client devices may connect with a network wirelessly via a nearest base station, access point, wireless router, etc. (collectively referred to herein as access points). In some cases, rather than connecting via a geographically nearest access point, a mobile client device may connect with the network via an access point having the best signal quality. A mobile client device may remain within the service area of such an access point for a relatively long period of time (referred to as "camped on" the access point) or may travel relatively rapidly through access point service areas, such as by using cellular handoff or reselection techniques for maintaining a communication session or for idle mode operation as association with access points is changed.

Limitations with respect to available spectrum, bandwidth, capacity, etc. may result in a network interface being unavailable or inadequate between a particular client device and access point. Moreover, limitations with respect to wireless signal propagation, such as shadowing, multipath fading, interference, etc., may result in a network interface being unavailable or inadequate between a particular client device and access point. Cellular networks have employed the use of various cell types, such as macrocells, microcells, picocells, and femtocells, to provide desired bandwidth, capacity, and wireless communication coverage within service areas. For example, the use of femtocells is often desirable to provide wireless communication in areas of poor network coverage (e.g., inside of buildings), to provide increased network capacity, to utilize broadband network capacity for backhaul, etc.

Mobile client devices generally operate using an internal power supply, such as a small battery, to facilitate their highly mobile operation. Typical operation to provide femtocell system selection, however, has an appreciable impact upon the power utilized by a mobile client device. Searching for available femtocells within range, negotiating links, etc. in typical use scenarios will often result in a reduction of the mobile client device standby time operation available from the internal power supply by approximately 10%. For example, an internal power supply may be appreciably drained as a result of a mobile client device continuing to search for femtocells whether or not appropriate femtocells are in range of the mobile client device.

SUMMARY

The present disclosure is directed to systems and methods that handle access terminals on an out-of-band piconet within a femto-proxy architecture. A femto-proxy system includes a femtocell (a femto access point, or FAP) and one or more out-of-band (OOB) proxies. The one or more OOB proxies of the femto-proxy system are typically located in proximity to the FAP, though they may or may not be integrated with the FAP according to various implementations (e.g., one or more OOB proxies may be implemented as a stand-alone-device in communication with the FAP).

One of the OOB proxies is configured to act as a master of an OOB piconet, through which various services are provided, including services to support the femtocell operation of the femto-proxy system. For example, the OOB piconet is used to facilitate lower power access to the macro communications services provided through the femtocell. In some cases, a combination of connected and inactive OOB operational modes are used to support an expanded number of slave access terminals on the piconet, where some of those slaves are operating in an active wireless wide area network (WWAN) mode and others are operating in an idle WWAN mode. For example, a parked OOB mode may be used for idle WWAN mode access terminals.

An exemplary method for extending a client set using a femto-proxy architecture includes receiving a WWAN communication at a femto-proxy system for a designated one of a number of access terminals communicatively coupled with the femto-proxy system, where the femto-proxy system includes: a femtocell configured to communicatively couple the access terminals with the WWAN, the access terminals configured to operate on the WWAN in a WWAN active mode or a WWAN idle mode; and an OOB femto-proxy configured to communicatively couple the access terminals with a piconet having the OOB femto-proxy as its master, the access terminals configured to operate on the piconet in an OOB connected mode or an OOB inactive mode. The exemplary method further includes: determining, subsequent to receiving the communication at the femto-proxy system, that the designated access terminal is operating in the OOB inactive mode with an inactive OOB physical communications link between the femto-proxy system and the designated access terminal; directing the designated access terminal to operate in the OOB connected mode; and establishing an active OOB physical communications link between the femto-proxy system and the designated access terminal. Embodiments of such a method may further deliver the communication from the femto-proxy system to the designated access terminal over the active OOB physical communications link.

Embodiments of such a method may further include determining whether a predetermined maximum number of access terminals is currently operating in the OOB connected mode on the piconet, wherein the directing the designated access terminal to operate in the OOB connected mode step is performed when the predetermined maximum number of access terminals is not currently operating in the OOB connected mode. Also or alternatively, embodiments of such a method may further include, when the predetermined maximum number of access terminals is currently operating in the OOB connected mode: identifying one of the access terminals currently operating in both the OOB connected mode and the WWAN idle mode; directing the identified one of the access terminals to operate in the OOB inactive mode, such that the predetermined maximum number of access terminals is not currently operating in the OOB connected mode; and directing the designated access terminal to operate in the OOB connected mode when the predetermined maximum number of access terminals is not currently operating in the OOB connected mode. Also or alternatively, embodiments of such a method may further include synchronizing a set of the access terminals operating in the OOB inactive mode during a periodic synchronization window, the set comprising the designated access terminal, wherein the designated access terminal is directed to operate in the OOB connected mode during the periodic synchronization window.

In some cases, the predetermined maximum number of access terminals currently operating in the OOB connected mode on the piconet is determined according to a maximum number of addresses available for OOB connected mode access terminals on the piconet. Also, in some cases, the OOB femto-proxy is configured to establish the piconet as a Bluetooth piconet, and the OOB inactive mode is a Bluetooth parked mode. Further, in some cases, directing the designated access terminal to operate in the OOB connected mode includes sending an unpark request from the OOB femto-proxy to the designated access terminal and receiving a response at the OOB femto-proxy from the designated access terminal accepting the unpark request; and establishing the active OOB physical communications link between the femto-proxy system and the designated access terminal includes establishing an asynchronous connection-oriented link logical transport. Also, in some cases, the access terminals are configured to consume lower power when operating in the OOB inactive mode than when operating in the OOB connected mode.

An exemplary femto-proxy system for handling an extended client set includes: a femtocell configured to communicatively couple a number of access terminals with a WWAN, the access terminals configured to operate on the WWAN in a WWAN active mode or a WWAN idle mode; an OOB femto-proxy, communicatively coupled with the femtocell, and configured to communicatively couple the access terminals with a piconet having the OOB femto-proxy as its master, the access terminals configured to operate on the piconet in an OOB connected mode or an OOB inactive mode; and a communications management subsystem, communicatively coupled with the femtocell and the OOB femto-proxy. The communications management subsystem is configured to: receive a WWAN communication for a designated one of the access terminals; determine, subsequent to receiving the communication at the femto-proxy system, that the designated access terminal is operating in the OOB inactive mode with an inactive OOB physical communications link between the OOB femto-proxy and the designated access terminal; direct the designated access terminal to operate in the OOB connected mode; and establish an active OOB physical communications link between the OOB femto-proxy and the designated access terminal.

Also or alternatively, embodiments of the communications management subsystem deliver the communication from the femto-proxy system to the designated access terminal over the active OOB physical communications link. The communications management subsystem may also or alternatively determine whether a predetermined maximum number of access terminals is currently operating in the OOB connected mode on the piconet, wherein the designated access terminal is directed to operate in the OOB connected mode step when the predetermined maximum number of access terminals is not currently operating in the OOB connected mode. Also or alternatively, embodiments of the communications management subsystem, when the predetermined maximum number of access terminals is currently operating in the OOB connected mode: identify one of the access terminals currently operating in both the OOB connected mode and the WWAN idle mode; direct the identified one of the access terminals to operate in the OOB inactive mode, such that the predetermined maximum number of access terminals is not currently operating in the OOB connected mode; and direct the designated access terminal to operate in the OOB connected mode when the predetermined maximum number of access terminals is not currently operating in the OOB connected mode.

Also or alternatively, embodiments of the communications management subsystem synchronize a set of the access terminals operating in the OOB inactive mode during a periodic synchronization window, the set comprising the designated access terminal, wherein the designated access terminal is directed to operate in the OOB connected mode during the periodic synchronization window. Also or alternatively, embodiments of the communications management subsystem direct the designated access terminal to operate in the OOB connected mode by sending an unpark request from the OOB femto-proxy to the designated access terminal and receiving a response at the OOB femto-proxy from the designated access terminal accepting the unpark request; and establish the active OOB physical communications link between the femto-proxy system and the designated access terminal by establishing an asynchronous connection-oriented link logical transport.

Another exemplary femto-proxy system for handling an extended client set includes: a femtocell configured to communicatively couple a number of access terminals with a WWAN, the access terminals configured to operate on the WWAN in a WWAN active mode or a WWAN idle mode; an OOB femto-proxy, communicatively coupled with the femtocell, and configured to communicatively couple the access terminals with a piconet having the OOB femto-proxy as its master, the access terminals configured to operate on the piconet in an OOB connected mode or an OOB inactive mode; means for receiving a WWAN communication for a designated one of the access terminals; means for determining, subsequent to receiving the communication at the femto-proxy system, that the designated access terminal is operating in the OOB inactive mode with an inactive OOB physical communications link between the OOB femto-proxy and the designated access terminal; means for directing the designated access terminal to operate in the OOB connected mode; and means for establishing an active OOB physical communications link between the OOB femto-proxy and the designated access terminal.

Also or alternatively, embodiments of such a femto-proxy system further include means for delivering the communication from the femto-proxy system to the designated access terminal over the active OOB physical communications link. Also or alternatively, embodiments of such a femto-proxy system further include means for determining whether a predetermined maximum number of access terminals is currently operating in the OOB connected mode on the piconet, wherein the designated access terminal is directed to operate in the OOB connected mode step when the predetermined maximum number of access terminals is not currently operating in the OOB connected mode. Also or alternatively, embodiments of such a femto-proxy system further include, when the predetermined maximum number of access terminals is currently operating in the OOB connected mode: means for identifying one of the access terminals currently operating in both the OOB connected mode and the WWAN idle mode; and means for directing the identified one of the access terminals to operate in the OOB inactive mode, such that the predetermined maximum number of access terminals is not currently operating in the OOB connected mode, wherein the designated access terminal is directed to operate in the OOB connected mode when the predetermined maximum number of access terminals is not currently operating in the OOB connected mode.

Also or alternatively, embodiments of such a femto-proxy system further include means for synchronizing a set of the access terminals operating in the OOB inactive mode during a periodic synchronization window, the set comprising the designated access terminal, wherein the designated access terminal is directed to operate in the OOB connected mode during the periodic synchronization window. In some cases, the means for directing the designated access terminal to operate in the OOB connected mode is configured to send an unpark request from the OOB femto-proxy to the designated access terminal and to receive a response at the OOB femto-proxy from the designated access terminal accepting the unpark request; and the means for establishing the active OOB physical communications link between the femto-proxy system and the designated access terminal is configured to establish an asynchronous connection-oriented link logical transport.

An exemplary processor for handling an extended client set is communicatively coupled with a femtocell configured to communicatively couple a number of access terminals with a WWAN and is communicatively coupled with an OOB femto-proxy configured to communicatively couple the access terminals with a piconet having the OOB femto-proxy as its master, the access terminals configured to operate on the piconet in an OOB connected mode or an OOB inactive mode and to operate on the WWAN in a WWAN active mode or a WWAN idle mode. Such an exemplary processor includes: a WWAN communications controller configured to receive a WWAN communication for a designated one of the plurality of access terminals; and an access terminal controller, configured to: determine, subsequent to receiving the communication at the femto-proxy system, that the designated access terminal is operating in the OOB inactive mode with an inactive OOB physical communications link between the OOB femto-proxy and the designated access terminal; direct the designated access terminal to operate in the OOB connected mode; and establish an active OOB physical communications link between the OOB femto-proxy and the designated access terminal. Also or alternatively, embodiments of the processor deliver the communication from the femto-proxy system to the designated access terminal over the active OOB physical communications link.

Also or alternatively, embodiments of the processor determine whether a predetermined maximum number of access terminals is currently operating in the OOB connected mode on the piconet, wherein the designated access terminal is directed to operate in the OOB connected mode step when the predetermined maximum number of access terminals is not currently operating in the OOB connected mode. Also or alternatively, embodiments of the access terminal controller, when the predetermined maximum number of access terminals is currently operating in the OOB connected mode: identify one of the access terminals currently operating in both the OOB connected mode and the WWAN idle mode; direct the identified one of the access terminals to operate in the OOB inactive mode, such that the predetermined maximum number of access terminals is not currently operating in the OOB connected mode; and direct the designated access terminal to operate in the OOB connected mode when the predetermined maximum number of access terminals is not currently operating in the OOB connected mode.

Also or alternatively, embodiments of the access terminal controller direct the designated access terminal to operate in the OOB connected mode by sending an unpark request from the OOB femto-proxy to the designated access terminal and receiving a response at the OOB femto-proxy from the designated access terminal accepting the unpark request; and establish the active OOB physical communications link between the femto-proxy system and the designated access terminal by establishing an asynchronous connection-oriented link logical transport. Also or alternatively, embodiments of the access terminal controller synchronize a set of the access terminals operating in the OOB inactive mode during a periodic synchronization window, the set comprising the designated access terminal, wherein the designated access terminal is directed to operate in the OOB connected mode during the periodic synchronization window.

An exemplary computer program product resides on a processor-readable medium and includes processor-readable instructions, which, when executed, cause a processor to receive a WWAN communication at a femto-proxy system for a designated one of a number of access terminals communicatively coupled with the femto-proxy system. The femto-proxy system includes: a femtocell configured to communicatively couple the access terminals with the WWAN, the access terminals configured to operate on the WWAN in a WWAN active mode or a WWAN idle mode; and an OOB femto-proxy configured to communicatively couple the access terminals with a piconet having the OOB femto-proxy as its master, the access terminals configured to operate on the piconet in an OOB connected mode or an OOB inactive mode. Such processor-readable instructions, which, when executed, further cause the processor to: determine, subsequent to receiving the communication at the femto-proxy system, that the designated access terminal is operating in the OOB inactive mode with an inactive OOB physical communications link between the femto-proxy system and the designated access terminal; direct the designated access terminal to operate in the OOB connected mode; and establish an active OOB physical communications link between the femto-proxy system and the designated access terminal. Also or alternatively, embodiments of the processor-readable instructions, when executed, cause the processor to deliver the communication from the femto-proxy system to the designated access terminal over the active OOB physical communications link.

Also or alternatively, embodiments of the processor-readable instructions, when executed, cause the processor to determine whether a predetermined maximum number of access terminals is currently operating in the OOB connected mode on the piconet, wherein the directing the designated access terminal to operate in the OOB connected mode step is performed when the predetermined maximum number of access terminals is not currently operating in the OOB connected mode. Also or alternatively, embodiments of the processor-readable instructions, when executed, cause the processor to, when the predetermined maximum number of access terminals is currently operating in the OOB connected mode: identify one of the access terminals currently operating in both the OOB connected mode and the WWAN idle mode; direct the identified one of the access terminals to operate in the OOB inactive mode, such that the predetermined maximum number of access terminals is not currently operating in the OOB connected mode; and direct the designated access terminal to operate in the OOB connected mode when the predetermined maximum number of access terminals is not currently operating in the OOB connected mode.

Also or alternatively, embodiments of the processor-readable instructions, when executed, cause the processor to direct the designated access terminal to operate in the OOB connected mode by sending an unpark request from the OOB femto-proxy to the designated access terminal and receiving a response at the OOB femto-proxy from the designated access terminal accepting the unpark request; and establish the active OOB physical communications link between the femto-proxy system and the designated access terminal by establishing an asynchronous connection-oriented link logical transport. Also or alternatively, embodiments of the processor-readable instructions, when executed, cause the processor to synchronize a set of the access terminals operating in the OOB inactive mode during a periodic synchronization window, the set comprising the designated access terminal, wherein the designated access terminal is directed to operate in the OOB connected mode during the periodic synchronization window.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
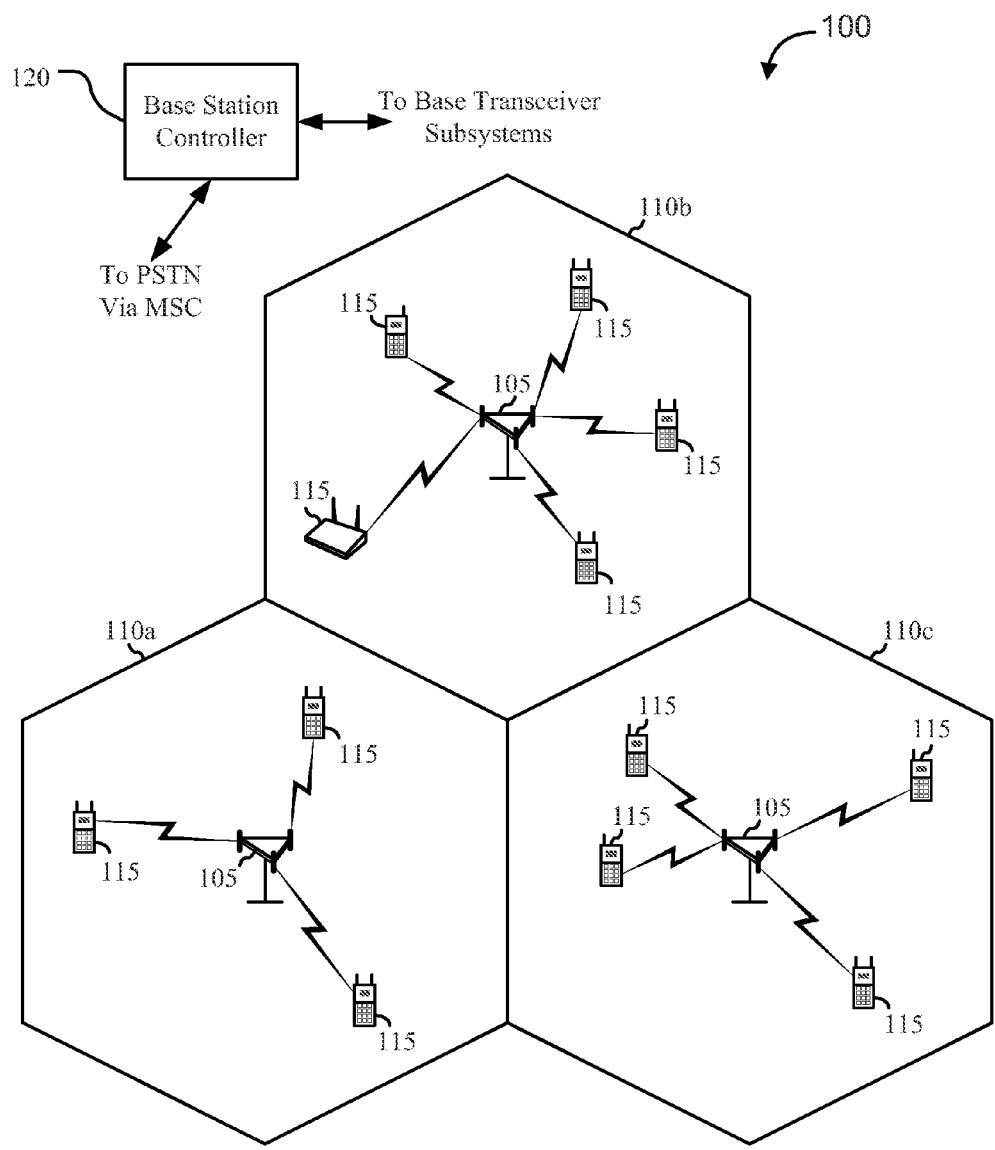
FIG. 1 shows a block diagram of a wireless communications system.

Handling of access terminals on an out-of-band piconet within a femto-proxy architecture is described. A femto-proxy system includes a femtocell (a femto access point, or FAP) and one or more out-of-band (OOB) proxies. One of the OOB proxies is configured to act as a master of an OOB piconet, through which various services are provided, including services to support the femtocell operation of the femto-proxy system. For example, the OOB piconet is used to facilitate lower power access to the macro communications services provided through the femtocell. In some cases, a combination of connected and inactive OOB operational modes are used to support an expanded number of slave access terminals on the piconet, where some of those slaves are operating in an active WWAN mode and others are operating in an idle WWAN mode. For example, parked mode may be used for idle WWAN mode access terminals.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure or claims. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base transceiver stations (BTSs) 105, disposed in cells 110, mobile access terminals 115 (ATs), and a base station controller (BSC) 120. It is worth noting that terminology like access terminal (AT), mobile station (MS), and others are used interchangeably herein and are not intended to imply a particular network topology or implementation. For example, while the "AT" terminology may typically be used for circuit switched (e.g., CDMA 1X) networks, and the "MS" terminology may typically be used for packet data service (e.g., EV-DO, HRPD) networks, the techniques described herein may be applied in the context of any of these or other networks.

The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier and may carry pilot, overhead information, data, etc. In some embodiments, the system 100 is a multi-carrier LTE network capable of efficiently allocating network resources.

The BTSs 105 can wirelessly communicate with the ATs 115 via a base station antenna. The BTSs 105 are configured to communicate with the ATs 115 under the control of the BSC 120 via multiple carriers. Each of the BTSs 105 can provide communication coverage for a respective geographic area, here the cell 110-a, 110-b, or 110-c. The system 100 may include BTSs 105 of different types, e.g., macro, pico, and/or femto base stations.

The ATs 115 can be dispersed throughout the cells 110. The ATs 115 may be referred to as mobile stations, mobile devices, user equipment (UE), or subscriber units. The ATs 115 here include cellular phones and a wireless communications device, but can also include personal digital assistants (PDAs), other handheld devices, netbooks, notebook computers, etc.

For the purposes of this disclosure, it is assumed that ATs 115 operate on (are "camped" on) a macro or similar network facilitated by multiple "macro" BTSs 105. Each macro BTS 105 may cover a relatively large geographic area (e.g., several kilometers in radius) and may allow unrestricted access to terminals with service subscriptions. The ATs 115 are also registered to operate on at least one femto network facilitated by a "femto" or "home" BTS 105. It will be appreciated that, while the macro BTSs 105 may typically be deployed according to network planning (e.g., resulting in the illustrative hexagonal cells 110 shown in FIG. 1), a femto BTS 105 may typically be deployed by individual users (or user representatives) to create a localized femtocell. The localized femtocell does not typically follow the macro network planning architecture (e.g., the hexagonal cells), although it may be accounted for as part of various macro-level network planning and/or management decisions (e.g., load balancing, etc.).

The AT 115 may generally operate using an internal power supply, such as a small battery, to facilitate their highly mobile operation. Strategic deployment of network devices, such as femtocells, can mitigate mobile device power consumption to some extent. For example, femtocells may be utilized to provide service within areas which might not otherwise experience adequate or even any service (e.g., due to capacity limitations, bandwidth limitations, signal fading, signal shadowing, etc.), thereby allowing client devices to reduce searching times, to reduce transmit power, to reduce transmit times, etc. Femtocells provide service within a relatively small service area (e.g., within a house or building). Accordingly, a client device is typically disposed near a femtocell when being served, often allowing the client device to communicate with reduced transmission power.

For example, the femtocell is implemented as a femto access point (FAP) located in a user premises, such as a residence, an office building, etc. The location may be chosen for maximum coverage (e.g., in a centralized location), to allow access to a global positioning satellite (GPS) signal (e.g., near a window), and/or in any other useful location. For the sake of clarity, the disclosure herein assumes that a set of ATs 115 is registered for (e.g., on a whitelist of) a single FAP that provides coverage over substantially an entire user premises. The "home" FAP provides the ATs 115 with access to communication services over the macro network. As used herein, the macro network is assumed to be a wireless wide-area network (WWAN). As such, terms like "macro network" and "WWAN network" are intended to be interchangeable. It will be appreciated that similar techniques may be applied to other types of network environments without departing from the scope of the disclosure or claims.

In exemplary configurations, the FAP is integrated with one or more out-of-band (OOB) proxies as a femto-proxy system. As used herein, "out-of-band," or "OOB," is intended to include any type of communications that are out of band with respect to the WWAN link. For example, the OOB proxies and/or the ATs 115 may be configured to operate using Bluetooth (e.g., class 1, class 1.5, and/or class 2), ZigBee (e.g., according to the IEEE 802.15.4-2003 wireless standard), WiFi, and/or any other useful type of communications out of the macro network band.

OOB integration with the FAP may provide a number of features. For example, the OOB proxies may allow for reduced interference, lower power femto discovery, etc.

Further, the integration of OOB functionality with the FAP may allow ATs 115 attached to the FAP to also be part of an OOB piconet. The piconet may facilitate enhanced FAP functionality, other communications services, power management functionality, and/or other features to the ATs 115. These and other features will be further appreciated from the description below.

Figure 2A:
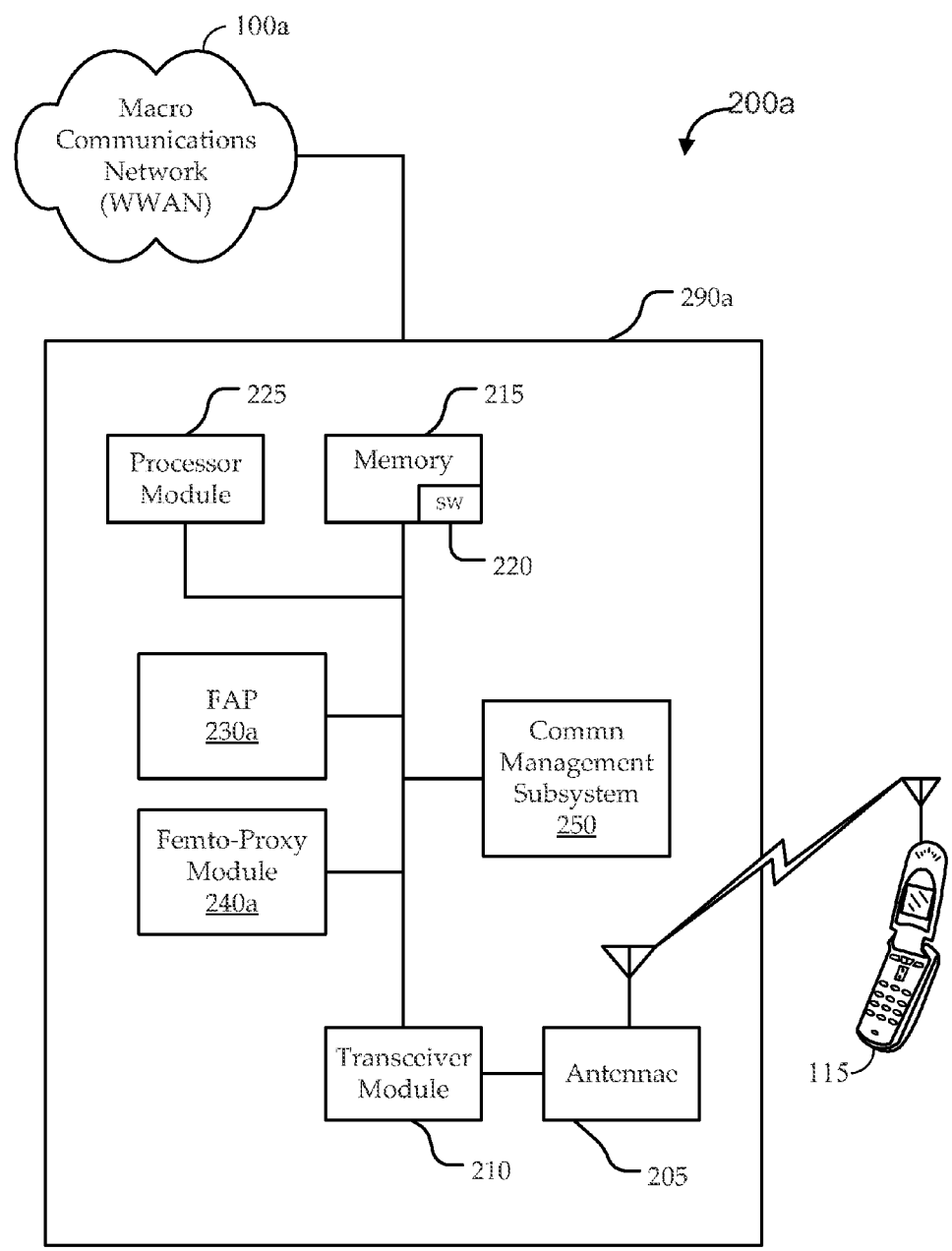
FIG. 2A shows a block diagram of an exemplary wireless communications system that includes a femto-proxy system.

FIG. 2A shows a block diagram of an exemplary wireless communications system 200a that includes a femto-proxy system 290a. The femto-proxy system 290a includes a femto-proxy module 240a, a FAP 230a, and a communications management subsystem 250. The FAP 230a may be a femto BTS 105, as described with reference to FIG. 1. The femto-proxy system 290a also includes antennae 205, a transceiver module 210, memory 215, and a processor module 225, which each may be in communication, directly or indirectly, with each other (e.g., over one or more buses). The transceiver module 210 is configured to communicate bi-directionally, via the antennae 205, with ATs 115. The transceiver module 210 (and/or other components of the femto-proxy system 290a) is also configured to communicate bi-directionally with a macro communications network 100a (e.g., a WWAN). For example, the transceiver module 210 is configured to communicate with the macro communications network 100a via a backhaul network. The macro communications network 100a may be the communications system 100 of FIG. 1.

The memory 215 may include random access memory (RAM) and read-only memory (ROM). The memory 215 may store computer-readable, computer-executable software code 220 containing instructions that are configured to, when executed, cause the processor module 225 to perform various functions described herein (e.g., call processing, database management, message routing, etc.). Alternatively, the software 220 may not be directly executable by the processor module 225 but is configured to cause the computer, e.g., when compiled and executed, to perform functions described herein.

The processor module 225 may include an intelligent hardware device, e.g., a central processing unit (CPU) such as those made by Intel® Corporation or AMD®, a microcontroller, an application specific integrated circuit (ASIC), etc. The processor module 225 may include a speech encoder (not shown) configured to receive audio via a microphone, convert the audio into packets (e.g., 30 ms in length) representative of the received audio, provide the audio packets to the transceiver module 210, and provide indications of whether a user is speaking. Alternatively, an encoder may only provide packets to the transceiver module 210, with the provision or withholding/suppression of the packet itself providing the indication of whether a user is speaking.

The transceiver module 210 may include a modem configured to modulate the packets and provide the modulated packets to the antennae 205 for transmission, and to demodulate packets received from the antennae 205. While some embodiments may include a single antenna 205, embodiments will typically include multiple antennae 205 for multiple links. For example, one or more links may be used to support macro communications with ATs 115. Also, one or more out-of-band links may be supported by the same or different antennae 205.

Notably, the femto-proxy system 290a is configured to provide both FAP 230a and femto-proxy module 240a functionality. For example, when the AT 115 approaches the femtocell coverage area, the AT's 115 OOB radio may begin searching for the OOB femto-proxy module 240a. Upon discovery, the AT 115 may have a high level of confidence that it is in proximity to the femtocell coverage area, and a scan for the FAP 230a can commence.

It is worth noting that the scan for the FAP 230a may be implemented in different ways. For example, due to the femto-proxy module 240a discovery by the AT's 115 OOB radio, both the AT 115 and the femto-proxy system 290a may be aware of each other's proximity. In some embodiments, the AT 115 scans for the FAP 230a. In other embodiments, the FAP 230a polls for the AT 115 (e.g., individually, or as part of a round-robin polling of all registered ATs 115), and the AT 115 listens for the poll. When the scan for the FAP 230a is successful, the AT 115 may attach to the FAP 230a.

When the AT 115 is in the femtocell coverage area and attached to the FAP 230a, the AT 115 may be in communication with the macro communications network 100a via the FAP 230a. As described above, the AT 115 may also be a slave of a piconet for which the femto-proxy module 240a acts as the master. For example, the piconet may operate using Bluetooth and may include Bluetooth communications links facilitated by a Bluetooth radio (e.g., implemented as part of the transceiver module 210) in the FAP 230a.

Embodiments of the FAP 230a have various configurations of base station or wireless access point equipment. As used herein, a FAP 230a may be a device that communicates with various terminals (e.g., client devices (ATs 115, etc.), proximity agent devices, etc.) and may also be referred to as, and include some or all the functionality of, a base station, a Node B, and/or other similar devices. Although referred to herein as a FAP 230a, it should be appreciated that the concepts herein are applicable to access point configurations other than femtocell configuration (e.g., picocells, microcells, etc.). Embodiments of FAP 230a utilize communication frequencies and protocols native to a corresponding cellular network (e.g., the macro communications network 100a, or a portion thereof) to facilitate communication within a femtocell coverage area associated with the FAP 230a (e.g., to provide improved coverage of an area, to provide increased capacity, to provide increased bandwidth, etc.).

The FAP 230a may be in communication with other interfaces not explicitly shown in FIG. 2A. For example, the FAP 230a may be in communication with a native cellular interface as part of the transceiver module 210 (e.g., a specialized transceiver utilizing cellular network communication techniques that may consume relatively large amounts of power in operation) for communicating with various appropriately configured devices, such as AT 115, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 230a may be in communication with one or more backend network interfaces as part of the transceiver module 210 (e.g., a backhaul interface providing communication via the Internet, a packet switched network, a switched network, a radio network, a control network, a wired link, and/or the like) for communicating with various devices or other networks.

As described above, the FAP 230a may further be in communication with one or more OOB interfaces as part of the transceiver module 210 and/or the femto-proxy module 240a. For example, the OOB interfaces may include transceivers that consume relatively low amounts of power in operation and/or may cause less interference in the in-band spectrum with respect to the in-band transceivers. Such an OOB interface may be utilized according to embodiments to provide low power wireless communications with respect to various appropriately configured devices, such as an OOB radio of the AT 115. The OOB interface may, for example, provide a Bluetooth link, an ultra-wideband (UWB) link, an IEEE 802.11 (WLAN) link, etc.

It should be clear that the terms "high power" and "low power" as used herein are relative terms and do not imply a particular level of power consumption. Accordingly, OOB devices (e.g., OOB femto-proxy module 240a) may simply consume less power than native cellular interface (e.g., for macro WWAN communications) for a given time of operation. In some implementations, OOB interfaces also provide relatively lower bandwidth communications, relatively shorter range communication, and/or consume relatively lower power in comparison to the macro communications interfaces. It should be appreciated, however, that there is no limitation that the OOB devices and interfaces be low power, short range, and/or low bandwidth. Embodiments may use any suitable out-of-band link, whether wireless or otherwise, such as IEEE 802.11, Bluetooth, PEANUT, UWB, ZigBee, an IP tunnel, a wired link, etc.

Exemplary femto-proxy modules 240a may provide various types of OOB functionality and may be implemented in various ways. A femto-proxy module 240a may have various configurations of devices, such as a stand-alone processor-based system, a processor-based system integrated with a host device (e.g., access point, gateway, router, switch, repeater, hub, concentrator, etc.), etc. For example, femto-proxy modules 240a may include various types of interfaces for facilitating various types of communications.

Some femto-proxy modules 240a include one or more OOB interfaces as part of the transceiver module 210 (e.g., a transceiver that may consume relatively low amounts of power in operation and/or may cause less interference than in the in-band spectrum) for communicating with other appropriately configured devices (e.g., an AT 115) for providing interference mitigation and/or femtocell selection herein through a wireless link. One example of a suitable communication interface is a Bluetooth-compliant transceiver that uses a time-division duplex (TDD) scheme.

Femto-proxy modules 240a may also include one or more backend network interfaces as part of the transceiver module 210 (e.g., packet switched network interface, switched network interface, radio network interface, control network interface, a wired link, and/or the like) for communicating with various devices or networks. Embodiments in which the femto-proxy module 240a is integrated within a host device, such as with FAP 230a, may utilize an internal bus or other such communication interface in the alternative to a backend network interface to provide communications between the femto-proxy module 240*a* and other devices, if desired. Additionally or alternatively, other interfaces, such as OOB interfaces, native cellular interfaces, etc., may be utilized to provide communication between femto-proxy module 240*a* and the FAP 230*a* and/or other devices or networks, according to embodiments.

According to exemplary configurations of the femto-proxy system 290*a*, various communications functions (e.g., including those of the FAP 230*a* and/or the femto-proxy module 240*a*) may be managed using the communications management subsystem 250. For example, the communications management subsystem 250 may at least partially handle communications with the macro (e.g., WWAN) network, one or more OOB networks (e.g., piconets, AT 115 OOB radios, other femto-proxies, OOB beacons, etc.), one or more other femtocells (e.g., FAPs 230), ATs 115, etc. In one exemplary configuration, the communications management subsystem 250 is a component of the femto-proxy system 290*a* in communication with some or all of the other components of the femto-proxy system 290*a* via a bus.

An exemplary communications management subsystem 250 may also be configured to manage piconet operations to extend a client set. As discussed above, the femto-proxy module 240*a* may be configured to act as a master of a piconet, in which ATs 115 in the femtocell coverage area are slaves. According to some OOB standards, there may be limits to the number of simultaneously active members allowed as part of the piconet. The communications management subsystem 250 may be configured to extend the piconet to extend the number of clients operating on the piconet.

For the sake of this disclosure, it is assumed that the piconet operates using the Bluetooth standard. It will be appreciated that similar issues, techniques, etc. may be applicable to piconets operating under different standards. One feature of Bluetooth is that slaves of the piconet may operate in at least a connected state or an inactive state. For example, according to the Bluetooth standard, a slave AT 115 may operate in one of three connected modes ("active," "sniff," or "hold") or one inactive mode ("park"). In the "active" mode, the AT 115 may engage in active communications over the Bluetooth transmission channel (e.g., the OOB link), and the master (e.g., the femto-proxy module 240*a*) regularly polls the slave ATs 115 for synchronization. In the "sniff" mode, the AT 115 may listen to piconet traffic for short durations at regular intervals for synchronization and burst communications. In the "hold" mode, only a counter on a Bluetooth module (e.g., chip) in the AT 115 may remain active (e.g., for synchronization), and the rest of the Bluetooth functionality of the AT 115 may return to the "active" mode after some hold duration.

In the connected modes described above, the AT 115 maintains its connected status with the piconet, even when the AT 115 is in "sniff" or "hold" mode, or is not otherwise actively communicating. In all the connected modes, an active member address ("AM_ADDR") and a default asynchronous connection-oriented link (ACL) are maintained for communicating with the AT 115 over the piconet. In the "park" mode, however, the AT 115 may give up its connected status on the piconet. In particular, the AT 115 may give up both its active member address and its default ACL. Instead, prior to entering "park" mode, the master (e.g., femto-proxy module 240*a*) may assign the AT 115 a parked member address ("PM_ADDR"). The parked AT 115 may receive regular (e.g., periodic) beacon signals over a broadcast channel, for example, to remain synchronized with the piconet and to listen for a directive to become connected.

Notably, as with the connected and inactive modes of the piconet, ATs 115 camped on the macro communications system 100*a* (e.g., on the femtocell) may operate in active or idle WWAN modes. For example, an inactive AT 115 may operate in an "idle" state on the WWAN, during which the AT 115 periodically wakes up (e.g., to listen for any pages, etc.) and returns to sleep. When a communication (e.g., a page) is received for the AT 115, the AT 115 may switch to an active mode (e.g., "traffic channel" mode) on the WWAN.

In the context of the femto-proxy system 290*a*, the Bluetooth piconet can be used (e.g., as facilitated by the femto-proxy module 240*a*) to provide reduced-power femtocell access. As discussed above, the OOB power consumption may be appreciably lower than the in-band power consumption. According to some exemplary configurations, the communications management subsystem 250 is configured to effectively off-load some or all WWAN communications to the OOB link through the femto-proxy module 240*a*. This may allow the ATs 115 in the femtocell coverage area to maintain WWAN communications services through the FAP 230 using appreciably lower power over time.

For example, ATs 115 camped on the femtocell may be directed by the femto-proxy module 240*a* to operate in the piconet in "sniff" mode. It will be appreciated that the "sniff" OOB mode may be substantially similar to the "idle" mode of the WWAN, and can be used in a relatively consistent way to maintain the AT 115 in an idle WWAN state at lower power. When it is desirable for the AT 115 to enter an active WWAN mode (e.g., for engaging in a cellular telephone phone call, etc.), the "sniff" OOB mode (or "active" OOB mode) may continue to be used in certain ways to support the macro communications. In some cases, the "sniff" intervals and/or windows may be adjusted for active versus idle WWAN mode support.

For the sake of illustration, when an AT 115 enters into the active WWAN mode, a number of link and mode combinations may be used to yield different features. According to one technique, the AT 115 uses its WWAN interface to communicate with the FAP 230*a* while using its OOB interface to maintain communications (e.g., in OOB "sniff" mode) with the femto-proxy module 240*a*. This may allow the AT 115 to not have to re-associate with the femto-proxy module 240*a* when the active session (e.g., the call) ends, and/or may allow the femto-proxy module 240*a* to continue to monitor pages on behalf of the AT 115. According to another technique, the AT 115 uses its WWAN interface to communicate with the FAP 230*a*, but detaches from the femto-proxy module 240*a* (e.g., leaves the piconet). The AT 115 may then re-associate with the femto-proxy module 240*a* later, for example, when the call ends. According to still another technique, the AT 115 does not use its WWAN interface to communicate with the FAP 230*a* (e.g., the WWAN interface remains powered down), and instead uses its OOB interface to maintain communications (e.g., in OOB "active" mode) with the FAP 230*a* via the femto-proxy module 240*a*. Notably, when the OOB link is used for active communications of this type, the OOB "sniff" mode may be insufficient to support the communications, and the "active" mode may have to be used instead.

It is worth noting that other states may be available as well. For example, during a data session, there may be periods of inactivity (e.g., where there is no data transfer) over which the AT 115 is operating in a WWAN semi-connected state. In these cases, a more aggressive OOB "sniff" mode may be used to support the communications. For example, the "sniff" interval may be shortened to check more often for data transfers, where desirable.

One potential limitation to this configuration is that certain OOB standards may only support a limited number of concurrently active (connected) slaves on the piconet. For example, according to the Bluetooth standard, the active member address is represented using three bits, while the parked member address is represented using eight bits. As such, while many (e.g., up to 256) parked slaves may be addressed using parked member addresses, the piconet may only be able to address up to seven concurrently active slaves using their respective active member addresses (i.e., the "000" address is reserved for broadcast communications).

While it may be possible, in certain cases, to use multiple Bluetooth radios in the femto-proxy module 240 to support multiple simultaneous piconets, this may yield undesirable results. One limitation to a multiple piconet approach is that the OOB radios may likely be located in substantially close proximity to each other. While each OOB radio may have a different hopping pattern, the hopping patterns may overlap at times, such that the two masters are broadcasting on the same frequency at the same time. This may cause the AT 115 to be unable to communicate reliably during those overlapping portions of the hopping pattern. Another limitation to a multiple piconet approach is that the implementation of a femto-proxy system 290 with multiple integrated OOB radios may be appreciably more complex, which may affect cost, performance, footprint, etc.

According to an exemplary approach, ATs 115 camped on the femtocell (e.g., in WWAN "idle" mode) are directed by the femto-proxy module 240 to operate in "park" mode, rather than in "sniff" mode. In "park" mode, the ATs 115 may effectively not be part of the piconet, which may allow the femto-proxy module 240 to potentially support a much larger client set. Further, the connected "sniff" mode and the inactive "park" mode both effectively cause the AT 115 to listen to the piconet for short durations at regular intervals, and operation in the "park" mode tends to consume less power than in the "sniff" mode. However, differences between the connected "sniff" mode and the inactive "park" mode may yield certain difficulties with this approach.

One difficulty is that the parked physical link between the AT 115 and the piconet may not support radio power control, and may not have a feedback path from the AT 115 to the master (e.g., for use in communicating signal strength information, etc.). This may, for example, affect the piconet's ability to regulate transmission power. Another difficulty is that supporting even a single active communication from the inactive "park" mode may take longer than from the connected "sniff" mode. For example, burst communications may be transmitted or received during a sniff duration, as the active physical link is maintained. However, parked ATs 115 must first be unparked, and an active link must be created, before active communications can occur. For example, to unpark an AT 115 may involve the master sending an unpark request to the parked member address of the AT 115, waiting for a response from the AT 115 indicating an acceptance of the unpark request, and thereafter changing a current parked physical link to an active physical link and re-creating a default ACL (and associating any L2CAP channels suspended during the park procedure with the re-created default ACL). These steps may introduce latency, which may yield an undesirable user experience for active slave ATs 115.

It will be appreciated from the above that the "sniff" and "park" modes each yield certain features. For example, while the "sniff" OOB mode can be used to support both active and idle WWAN modes, the addressing may limit the number of ATs 115 participating in the piconet. By contrast, while the "park" OOB mode provides a large addressing space, it may not effectively support active WWAN clients.

Thus, some exemplary communications management subsystems 250 direct idle WWAN clients to operate in inactive "park" OOB mode and active WWAN clients to operate on the piconet in a connected (e.g., "sniff" or "active") OOB mode. For example, in one exemplary configuration, the femto-proxy system 290a receives a WWAN communication for a designated AT 115 camped on the femtocell. The communications management subsystem 250 determines that the designated AT 115 is operating in an OOB inactive mode (e.g., "park" mode) with an inactive OOB physical communications link between the femto-proxy module 240a and the designated AT 115. The AT 115 is directed (e.g., by the communications management subsystem 250) to operate in the OOB connected mode. For example, the AT 115 is directed to switch to "sniff" or "active" mode.

In some cases, the parking and/or unparking of ATs 115 is performed substantially concurrently with a regular synchronization cycle (e.g., during a window in which a synchronization beacon signal is broadcast to the parked ATs 115). An active OOB physical communications link may be established between the femto-proxy module 240a and the designated AT 115. For example, the communications management subsystem 250 may handle delivery of the communication from the femto-proxy system 290a to the AT 115 over the active OOB physical communications link.

The communications management subsystem 240 may also determine whether a predetermined maximum number of access terminals is currently operating in an OOB connected mode on the piconet. If not, the AT 115 may be directed to operate in the OOB connected mode. If so, it may be desirable or necessary to move another AT 115 out of connected mode (e.g., to park the other AT 115). For example, the communications management subsystem 250 may identify one of the access terminals currently operating in both the OOB connected mode and the WWAN idle mode. This may be an AT 115 that is currently in both the "idle" WWAN mode and the "sniff" OOB mode. The communications management subsystem 250 may direct the identified (e.g., idle WWAN client) AT 115 to operate in the OOB inactive mode (e.g., "park"), such that the predetermined maximum number of access terminals is no longer operating in the OOB connected mode. Having available active positions in the piconet, the designated AT 115 may be directed to operate in the OOB connected mode.

It is worth noting that, according to the above exemplary configuration, a large number of ATs 115 may be slaves of the piconet, but there is still a limit on the number of concurrently active slaves (e.g., due to the limited active member address space). As discussed above, the limit of concurrently active slave ATs 115 may be determined as the maximum number allowed by the active member address space (e.g., seven, according to the Bluetooth standard). If the maximum number of active member addresses is used as the limit, an AT 115 that is both in active WWAN mode and in connected OOB mode may have to be released by the femto-proxy module 240a to free up an active member address. As such, the limit of concurrently active slave ATs 115 may typically be determined as less than the maximum number allowed by the active member address space.

In one example, the limit is one less than the maximum number of active member addresses. Maintaining availability may allow more rapid activation of a previously parked AT 115. Subsequent to activation of the previously parked AT 115, the communications management subsystem 240 may identify and park an AT 115 that is idle on the WWAN to maintain the availability of at least one active slot on the piconet. For instance, suppose that all ATs 115 in OOB "active" mode are also in WWAN active mode. If a page message comes for an AT 115 in OOB "park" mode, the femto-proxy module 240a may have to unpark the AT 115 into OOB "active" mode to make the AT 115 aware of its incoming page (e.g., after which the AT 115 may leave the piconet by returning to OOB "park" mode, etc.). Notably, it may be desirable to have at least one available active member address to temporality assign to that AT 115. Because of latencies introduced by state changes of ATs 115 (e.g., unparking ATs 115), the femto-proxy system 290a may be configured to buffer data during the time when the unpark request is sent and the OOB physical link is set up to enter into OOB "active" mode.

In another example, the limit is set according to the number of active clients that can be supported by the femtocell. For example, the FAP 230 may only be able to support four concurrently active WWAN clients (e.g., due to bandwidth limitations, etc.). As such, it may be inefficient in some cases to maintain more than four ATs 115 in a connected OOB mode, thereby leaving up to three active slots available on the piconet.

In some cases, it may be desirable to set other network settings according to the techniques chosen for extended client support on the piconet. For example, the OOB proxy may use a periodic beacon signal (or other signal) to determine whether there is link loss. If ATs 115 do not respond to the signal (e.g., one or more times in a row), the lack of response may be interpreted as a loss of link with that AT 115. The period of such a signal may be set so that occasional misses (e.g., during a sniff cycle) do not indicate link loss. For example, a "SupervisionTO" interval for BT link loss detection can be set to two-times the WWAN paging cycle value (e.g., for a 1.28-second paging cycle, the "SupervisionTO" interval can be set to 2.56 seconds).

Various other architectures are possible according to embodiments of femto-proxy system 290a other than those illustrated by FIG. 2A. The FAP 230a and femto-proxy module 240a may or may not be collocated, integrated into a single device, configured to share components, etc. For example, the femto-proxy system 290a of FIG. 2A shows an integrated FAP 230a and femto-proxy module 240a that at least partially share components, including the antennae 205, the transceiver module 210, the memory 215, and the processor module 225.

Figure 2B:
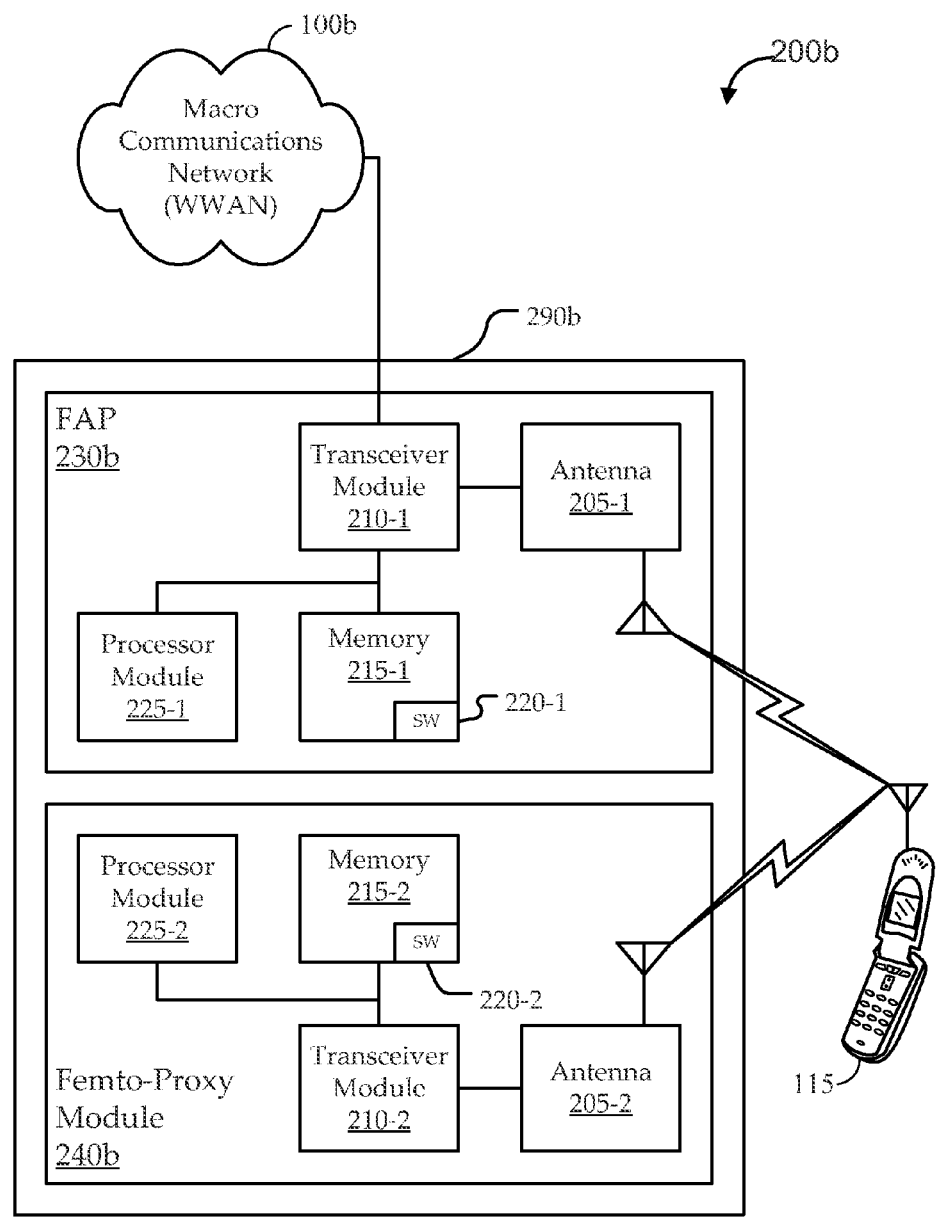
FIG. 2B shows a block diagram of an exemplary wireless communications system that includes an architecture of a femto-proxy system that is different from the architecture shown in FIG. 2A.

FIG. 2B shows a block diagram of an exemplary wireless communications system 200b that includes an architecture of a femto-proxy system 290b that is different from the architecture shown in FIG. 2A. As in FIG. 2A, the femto-proxy system 290b includes a femto-proxy module 240b and a FAP 230b. Unlike FIG. 2A, however, each of the femto-proxy module 240b and the FAP 230b has its own antenna 205, transceiver module 210, memory 215, and processor module 225. Both transceiver modules 210 are configured to communicate bi-directionally, via their respective antennae 205, with ATs 115. The transceiver module 210-1 of the FAP 230b is illustrated in bi-directional communication with the macro communications network 100b (e.g., typically over a backhaul network).

For the sake of illustration, the femto-proxy system 290b is shown without a separate communications management subsystem 250. Of course, in some configurations, a communications management subsystem 250 is provided in both the femto-proxy module 240b and the FAP 230b. In other configurations, the communications management subsystem 250 is implemented as part of the femto-proxy module 240b. In still other configurations, functionality of the communications management subsystem 250 is implemented as a computer program product (e.g., stored as software 220 in memory 215) of one or both of the femto-proxy module 240b and the FAP 230b.

Figure 3:
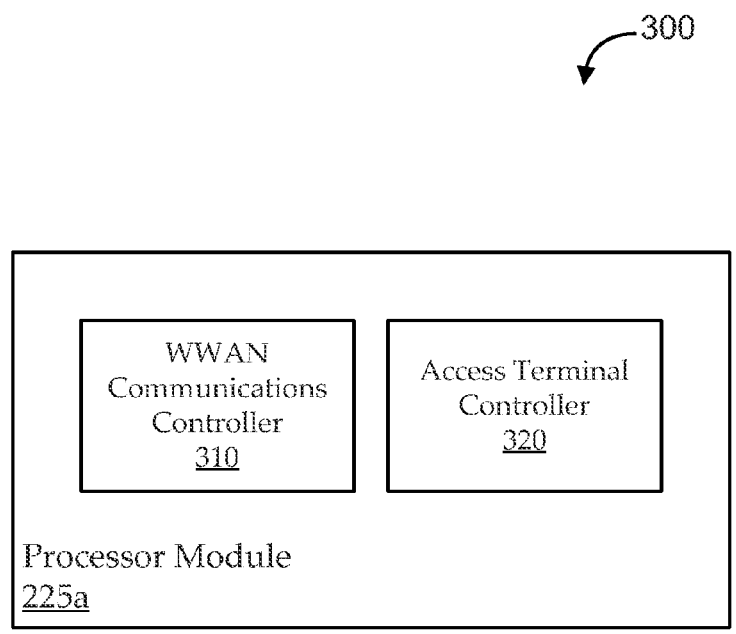
FIG. 3 shows a block diagram of an exemplary configuration of the processor module for implementing functionality of the communications management subsystem.

In yet other configurations, some or all of the functionality of the communications management subsystem 250 is implemented as components of the processor module 225. FIG. 3 shows a block diagram 300 of an exemplary configuration of the processor module 225a for implementing functionality of the communications management subsystem 250. The processor module 225a includes a WWAN communications controller 310 and an access terminal controller 320.

In one exemplary configuration, the processor module 225a is in communication (e.g., as illustrated in FIGS. 2A and 2B) with a FAP 230 and a femto-proxy module 240. The access terminal controller 320 is configured to receive a WWAN communication (e.g., a page) for a designated AT 115. The access terminal controller 320 determines that the designated AT 115 is operating in the OOB inactive mode with an inactive OOB physical communications link between the OOB femto-proxy and the designated access terminal. The access terminal controller 320 directs the AT 115 to operate in the OOB connected mode (e.g., substantially concurrently with a regular communication cycle, like the synchronization beacon cycle), and establishes an active OOB physical communications link between the OOB femto-proxy and the designated access terminal. In some cases, the access terminal controller 320 facilitates delivery of the communication to the AT 115 over the active OOB physical communications link.

The access terminal controller 320 may also determine whether a predetermined maximum number of access terminals is currently operating in an OOB connected mode on the piconet. If not, the AT 115 may be directed to operate in the OOB connected mode. If so, it may be desirable or necessary to move another AT 115 out of connected mode (e.g., to park the other AT 115). For example, the access terminal controller 320 may identify one of the access terminals currently operating in both the OOB connected mode and the WWAN idle mode. This may be an AT 115 that is currently in both the "idle" WWAN mode and the "sniff" OOB mode. The access terminal controller 320 may direct the identified (e.g., idle WWAN client) AT 115 to operate in the OOB inactive mode (e.g., "park"), such that the predetermined maximum number of access terminals is no longer operating in the OOB connected mode. Having available active positions in the piconet, the designated AT 115 may be directed to operate in the OOB connected mode.

Notably, both the FAP 230a of FIG. 2A and the FAP 230b of FIG. 2B are illustrated as providing a communications link only to the macro communications network 100a. However, embodiments of FAPs 230 can provide communications functionality via many different types of networks and/or topologies. For example, the FAP 230 may provide a wireless interface for a cellular telephone network, a cellular data network, a local area network (LAN), a metropolitan area network (MAN), a wide area network (WAN), the public switched telephone network (PSTN), the Internet, etc.

Figure 4A:
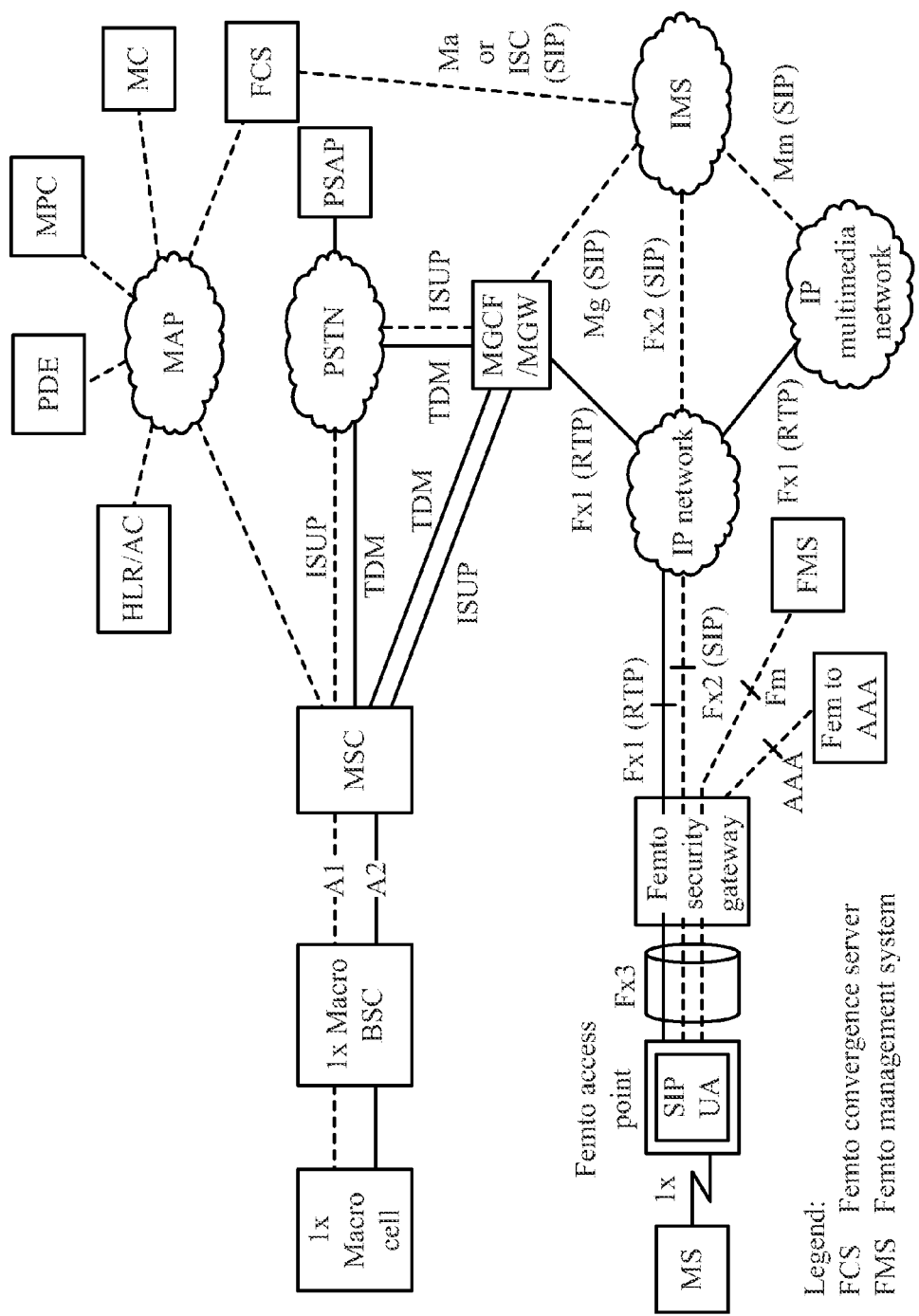
FIG. 4A shows detail regarding an exemplary femtocell architecture for legacy circuit services, like a CDMA 1X circuit switched services network.
Figure 4B:
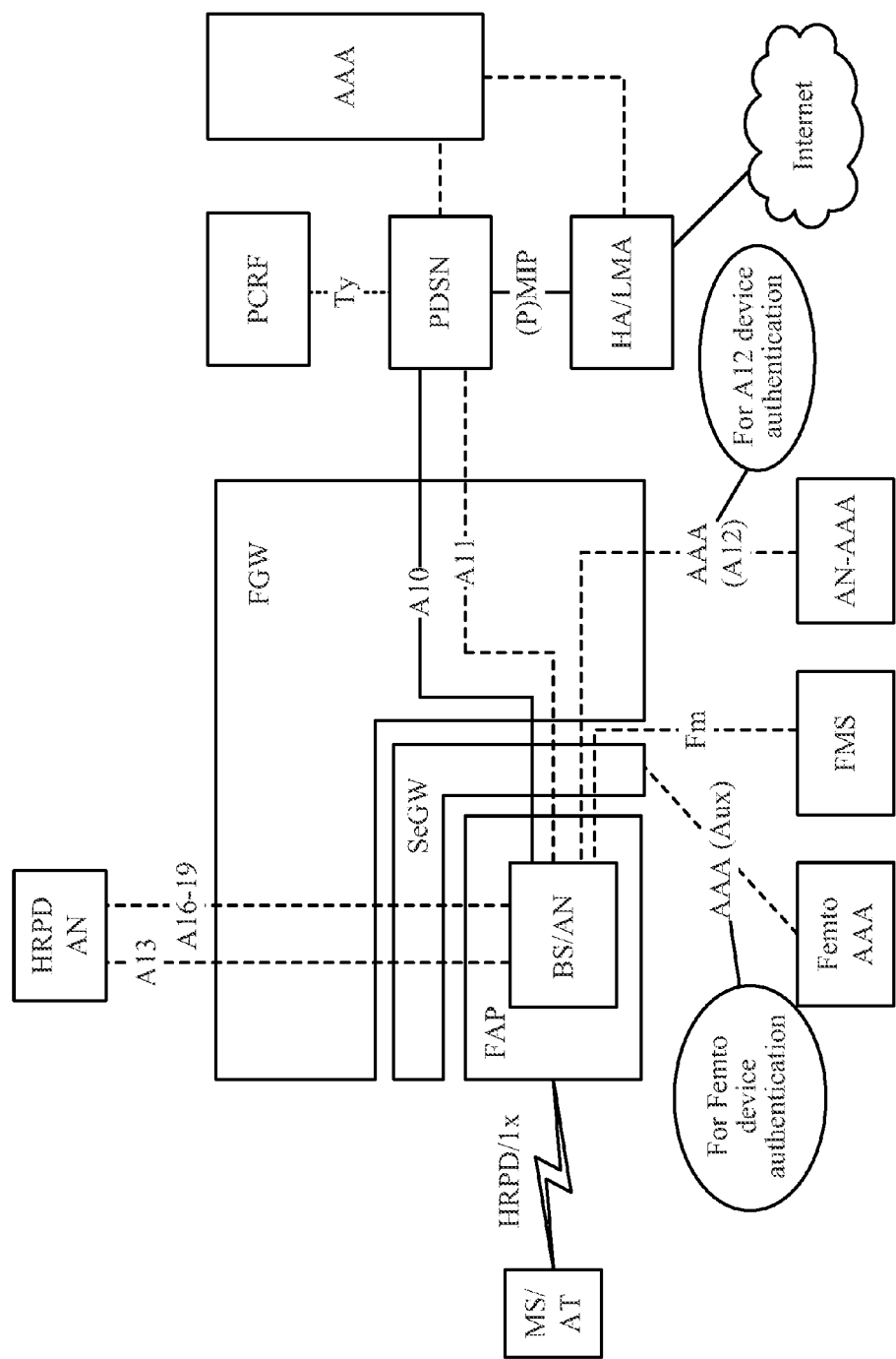
FIG. 4B shows detail regarding an exemplary femtocell architecture for packet data service access using legacy interfaces, like a 1x EV-DO (HRPD) packet data services network.

FIGS. 4A and 4B show further detail with respect to femtocell architecture in communication networks for providing various services. Specifically, FIG. 4A shows detail regarding an exemplary femtocell architecture for legacy circuit services. For example, the network of FIG. 4A may be a CDMA 1X circuit switched services network. FIG. 4B shows detail regarding an exemplary femtocell architecture for packet data service access using legacy interfaces. For example, the network of FIG. 4B may be a 1X EV-DO (HRPD) packet data services network. These exemplary architectures may illustrate portions of the communications systems and networks FIGS. 1-3.

Figure 5:
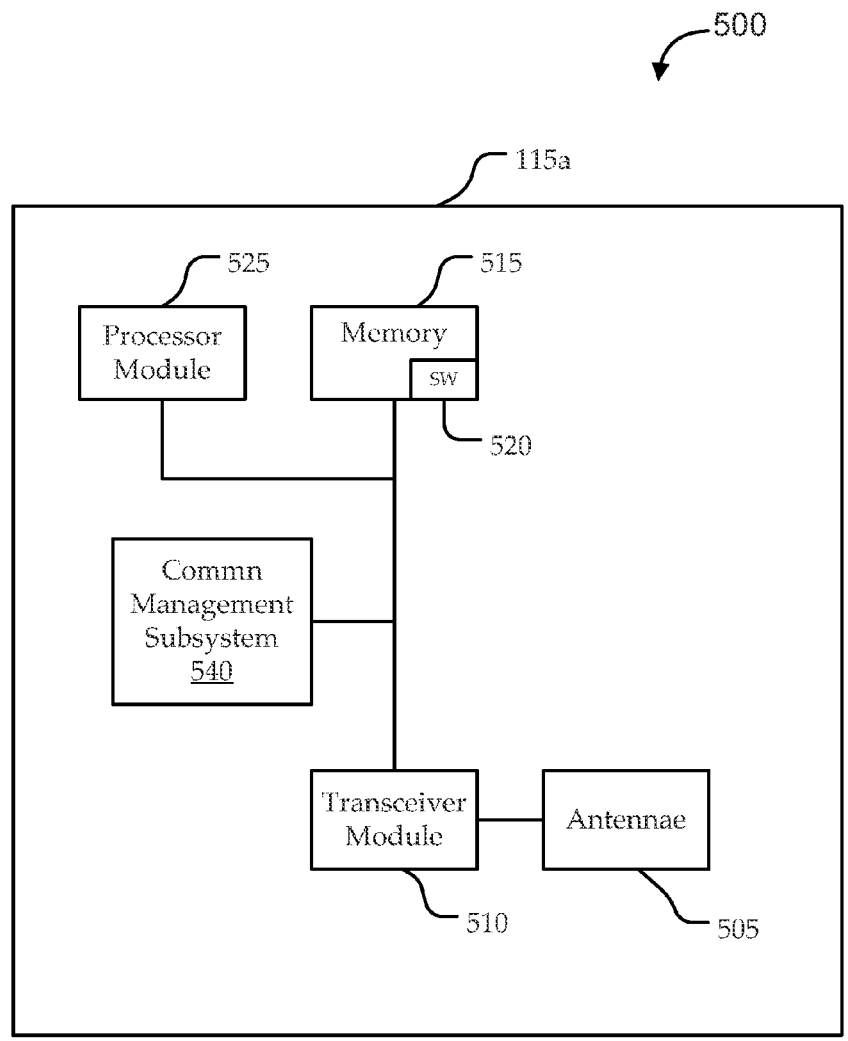
FIG. 5 shows a block diagram of an exemplary mobile access terminal for use with the femto-proxy systems of FIGS. 3A and 3B and in the context of the communications systems and networks of FIGS. 1-4B.

As described above, the femto-proxy systems 290 are configured to communicate with client devices, including ATs 115. FIG. 5 shows a block diagram 500 of an exemplary mobile access terminal (ATs) 115a for use with the femto-proxy systems 290 of FIGS. 2A and 2B and in the context of the communications systems and networks of FIGS. 1-4B. The AT 115a may have various configurations of devices, such as personal computers (e.g., laptop computers, netbook computers, tablet computers, etc.), cellular telephones, PDAs, digital video recorders (DVRs), internet appliances, gaming consoles, e-readers, etc. For the purpose of clarity, the AT 115a is assumed to be provided in a mobile configuration, having an internal power supply (not shown), such as a small battery, to facilitate mobile operation.

The AT 115 includes antennae 505, a transceiver module 510, memory 515, and a processor module 525, which each may be in communication, directly or indirectly, with each other (e.g., via one or more buses). The transceiver module 510 is configured to communicate bi-directionally, via the antennae 505 and/or one or more wired or wireless links, with one or more networks, as described above. For example, the transceiver module 510 is configured to communicate bi-directionally with BTSs 105 of the macro communications network (e.g., the communications system 100 of FIG. 1), and, in particular, with at least one FAP 230.

As described above, the transceiver module 510 may be configured to further communicate over one or more OOB links. For example, embodiments communicate with a femto-proxy system 290 (e.g., as described with reference to FIGS. 2A and 2B) over both an in-band (e.g., macro) link to the FAP 230 and at least one OOB link to the femto-proxy module 240. The transceiver module 510 may include a modem configured to modulate the packets and provide the modulated packets to the antennae 505 for transmission, and to demodulate packets received from the antennae 505. While some embodiments may include a single antenna 505, embodiments will typically include multiple antennae 505 for multiple links.

The memory 515 may include random access memory (RAM) and read-only memory (ROM). The memory 515 may store computer-readable, computer-executable software code 520 containing instructions that are configured to, when executed, cause the processor module 525 to perform various functions described herein (e.g., call processing, database management, message routing, etc.). Alternatively, the software 520 may not be directly executable by the processor module 525 but is configured to cause the computer, e.g., when compiled and executed, to perform functions described herein.

The processor module 525 may include an intelligent hardware device, e.g., a central processing unit (CPU) such as those made by Intel® Corporation or AMD®, a microcontroller, an application specific integrated circuit (ASIC), etc. The processor module 525 may include a speech encoder (not shown) configured to receive audio via a microphone, convert the audio into packets (e.g., 30 ms in length) representative of the received audio, provide the audio packets to the transceiver module 510, and provide indications of whether a user is speaking. Alternatively, an encoder may only provide packets to the transceiver module 510, with the provision or withholding/suppression of the packet itself providing the indication of whether a user is speaking.

According to the exemplary architecture of FIG. 5, the AT 115a further includes a communications management subsystem 540. The communications management subsystem 540 may manage communications with the macro (e.g., WWAN) network, one or more OOB networks (e.g., piconets, femto-proxy modules 240, etc.), one or more femtocells (e.g., FAPs 230), other ATs 115 (e.g., acting as a master of a secondary piconet), etc. In one exemplary configuration, the communications management subsystem 540 is a component of the AT 115a in communication with some or all of the other components of the AT 115a via a bus. In other exemplary configurations, functionality of the communications management subsystem 540 is implemented as a component of the transceiver module 510, as a computer program product, and/or as one or more controller elements of the processor module 525.

It is worth noting that the AT 115a includes communications functionality for interfacing with both the macro (e.g., cellular) network and one or more OOB networks (e.g., the femto-proxy module 240 link. For example, some ATs 115 include native cellular interfaces as part of the transceiver module 510 or the communications management subsystem 540 (e.g., a transceiver utilizing cellular network communication techniques that consume relatively large amounts of power in operation) for communicating with other appropriately configured devices (e.g., for establishing a link with a macro communication network via FAP 230) through a native cellular wireless link. The native cellular interfaces may operate according one or more communication standards, including, but not limited to, W-CDMA, CDMA2000, GSM, WiMax, and WLAN.

Furthermore, the ATs 115 may also include OOB interfaces implemented as part of the transceiver module 510 and/or the communications management subsystem 540 (e.g., a transceiver that may consume relatively low amounts of power in operation and/or may cause less interference in the in band spectrum) for communicating with other appropriately configured devices over a wireless link. One example of a suitable OOB communication interface is a Bluetooth-compliant transceiver that uses a time-division duplex (TDD) scheme.

Figure 6:
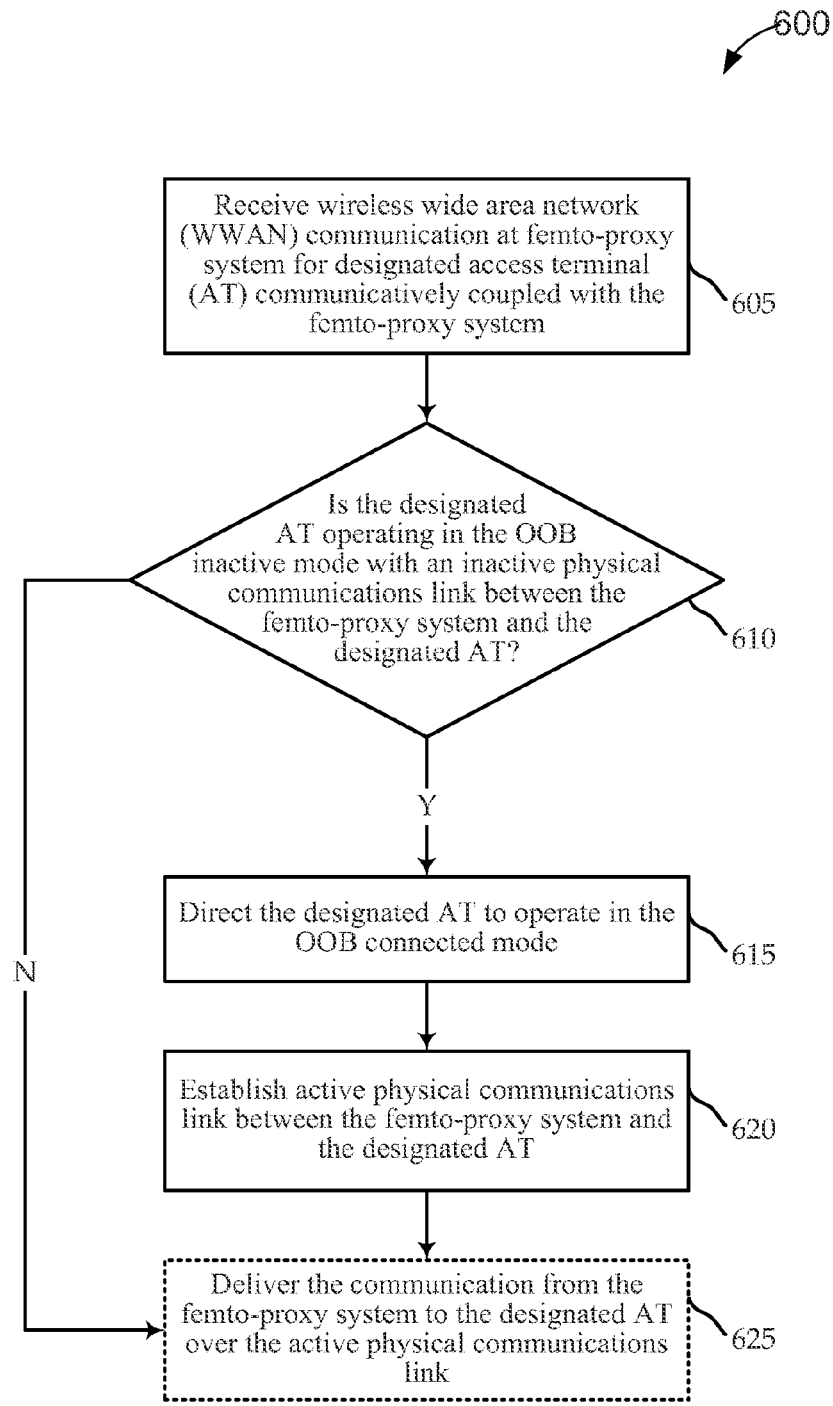
FIG. 6 shows a flow diagram of an exemplary method for handling clients on a piconet.

Directing attention to FIG. 6, a flow diagram is shown of an exemplary method 600 for handling an extended client set on a piconet. The method 600 may operate in the context of a femto-proxy system 290 architecture. For example, the femto-proxy system 290 includes a FAP 230 for providing WWAN (macro) communications services to ATs 115 within the femtocell coverage area. The femto-proxy system 290 also includes a femto-proxy module 240 configured, among other things, to act as a master of an OOB piconet.

It may be assumed for context that a set of ATs 115 are attached to the FAP 230 and are slaves of the OOB piconet having the femto-proxy module 240 as its master. Each AT 115 is configured to operate on the WWAN in either an active or an idle WWAN mode, and on the piconet in either a connected or an inactive OOB mode. The piconet is configured so that a limited number of ATs 115 may concurrently operate in the connected OOB mode, and that a larger (e.g., though typically still limited) number of ATs 115 may concurrently operate in the inactive OOB mode (e.g., the Bluetooth "park" mode).

At stage 605, a wireless wide area network (WWAN) communication is received at the femto-proxy system 290 for a designated AT 115 camped on the femtocell (i.e., communicatively coupled with the femto-proxy system). If the designated AT 115 is already in the WWAN active and or the OOB connected mode, the AT 115 may simply receive the communication via the FAP 230 or the femto-proxy module 240. At stage 610, a determination is made as to whether the designated AT 115 is operating in the OOB inactive mode with an inactive OOB physical communications link (e.g., the AT 115 is parked).

If it is determined, at stage 610, that the designated AT 115 is not in the OOB inactive mode (i.e., that the designated AT 115 is already in an OOB connected mode), the method 600 may continue at stage 625 by delivering the communication from the femto-proxy system 290 to the designated AT 115 over an active OOB physical communications link. If it is determined, at stage 610, that the designated AT 115 is in the OOB inactive mode, the designated AT 115 may be directed to operate in the OOB connected mode at stage 615. For example, an unpark request may be sent to the AT's 115 parked member address by the femto-proxy module 240. In some cases, an acceptance response may subsequently be received at the femto-proxy module 240 from the AT 115.

At stage 620, an active OOB physical communications link may be established between the femto-proxy system and the designated access terminal. This may involve changing a current parked physical link to an active physical link and re-creating a default ACL. Further, the re-created default ACL may be associated with any L2CAP channels previously suspended during the park procedure. In some cases, the method 600 continues at stage 625 by delivering the communication from the femto-proxy system 290 to the designated AT 115 over the active OOB physical communications link.

Figure 7A:
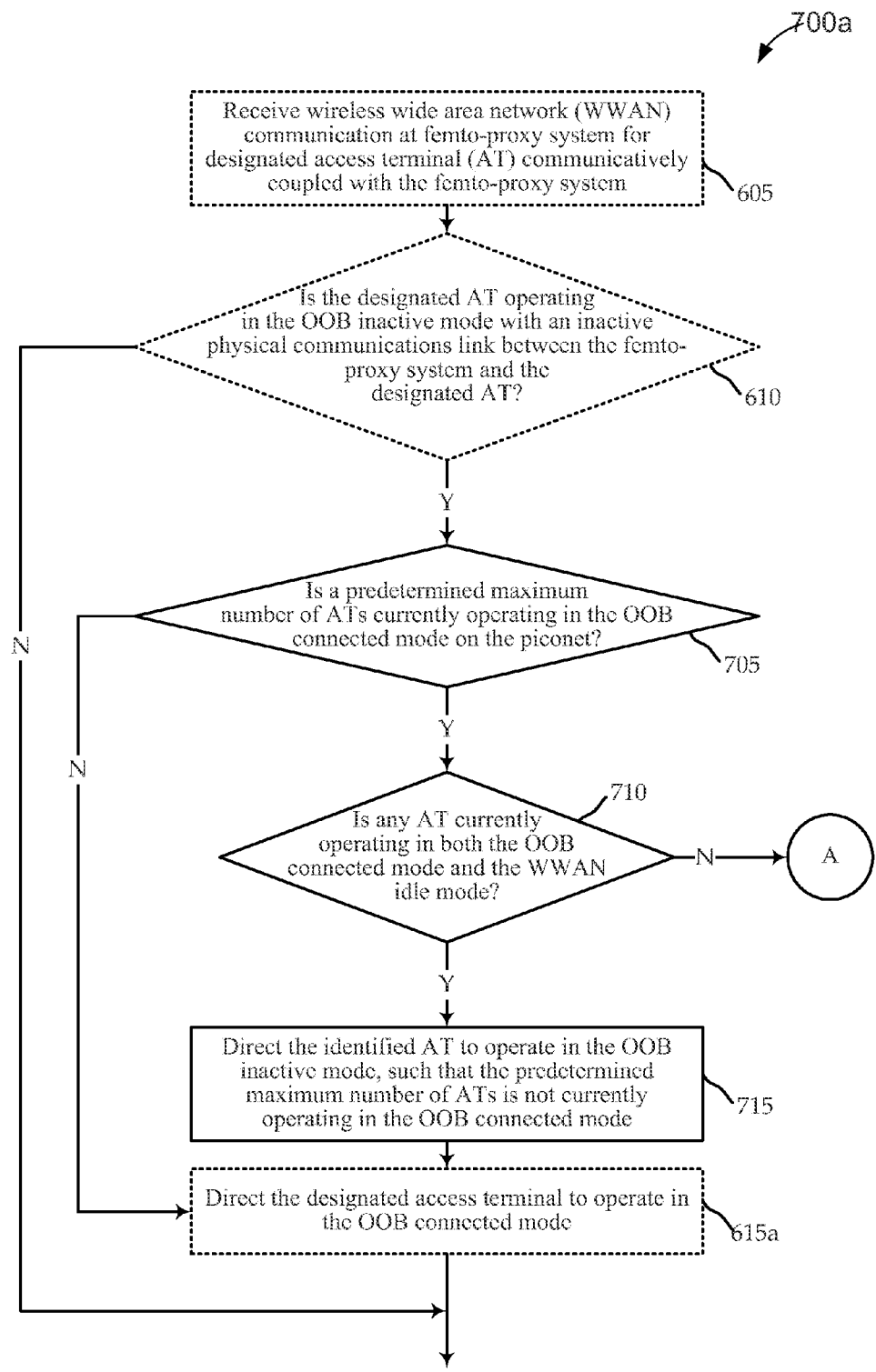
FIGS. 7A and 7B show a flow diagram of an exemplary method for handling extended piconet client sets in this type of context.
Figure 7B:
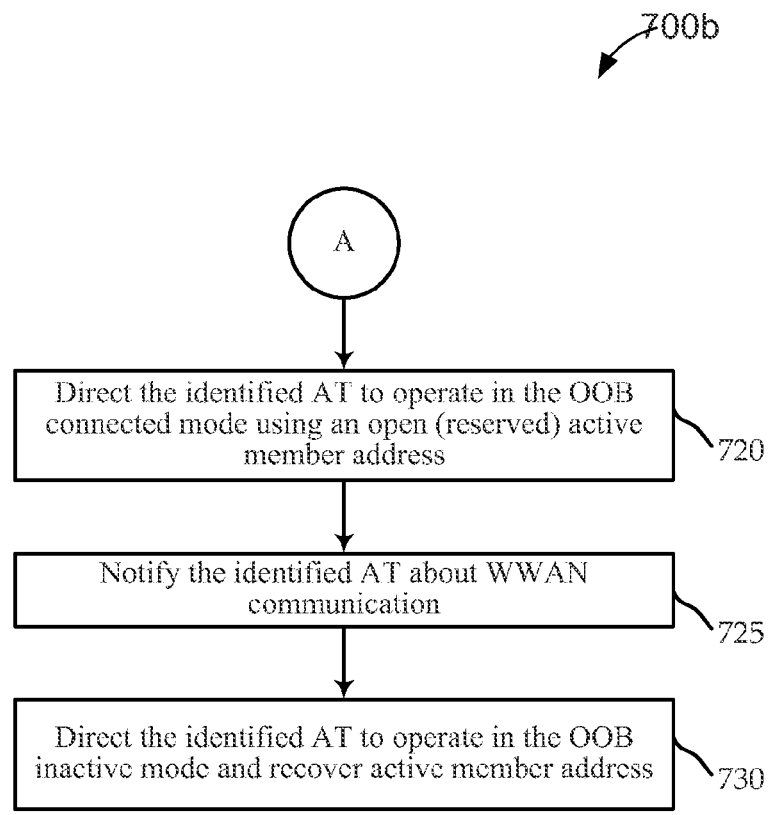

As discussed above, certain techniques may be used to handle extended client sets, for example, when the number of slave ATs 115 on the piconet is greater than a predetermined maximum number of allowed concurrently active slaves. FIGS. 7A and 7B show a flow diagram of an exemplary method 700 for handling extended piconet client sets in this type of context. For example, the piconet may support only a limited addressing space for concurrently active slave ATs 115, which may thereby limit the maximum number of concurrently active slave ATs 115 allowed on the piconet.

The method 700 may operate in the context of the method 600 of FIG. 6. For example, additional method 700 stages are shown in the context of stages 605, 610, and 615 of the method 600 of FIG. 6 (shown in dashed boxes for reference). Thus, the context of the method 700 may begin at stages 605 and 610, where a WWAN communication is received at the femto-proxy system 290 for a designated AT 115 camped on the femtocell, and the designated AT 115 is determined to be operating in the OOB inactive mode with an inactive OOB physical communications link, respectively. For example, where it is determined, at stage 610, that the designated AT 115 is not in the OOB inactive mode (i.e., already in the OOB connected mode), the method 700a may proceed as described above with reference to the method 600 of FIG. 6.

Turning to a first portion of the method 700a shown in FIG. 7A, at stage 705, a determination is made as to whether a predetermined maximum number of access terminals is currently operating in the OOB connected mode on the piconet (e.g., whether the maximum number of concurrently active slave ATs 115 has been reached). As described above, this predetermined maximum may typically be less (e.g., one less) than the number of active member addresses allowed by the OOB specification. If not, the method 700 may direct the designated access terminal to operate in the OOB connected mode at stage 615a (e.g., as in stage 615 of the method 600 of FIG. 6).

If the determination is made at stage 705 that the predetermined maximum number of access terminals is currently operating in the OOB connected mode on the piconet, another determination may be made, at stage 710, as to whether any access terminal is currently operating in both the OOB connected mode and the WWAN idle mode. For example, this may be an AT 115 that is operating in one of the Bluetooth connected modes on the piconet (e.g., in "sniff" or "active" mode), but is not currently active on the WWAN (e.g., in "idle" mode). If the determination is made at stage 710 that an identified access terminal is currently operating in both the OOB connected mode and the WWAN idle mode, the identified (e.g., "idle") access terminal may be directed to operate in the OOB inactive mode at stage 715, such that the predetermined maximum number of access terminals is no longer currently operating in the OOB connected mode. For example, the femto-proxy module 240 may initiate a park procedure to park the identified AT 115, thereby freeing up one of the active member addresses. Having freed up one of the active member addresses, the method 700 may now direct the designated access terminal to operate in the OOB connected mode at stage 615a.

If the determination is made at stage 710 that no identified access terminals are currently operating in both the OOB connected mode and the WWAN idle mode, the method 700 may proceed as illustrated by the second portion of the method 700b shown in FIG. 7B (as indicated by off-page reference "A"). At stage 720, the identified access terminal may be directed to operate in the OOB connected mode (e.g., OOB "active" mode) using an open active member address. For example, the predetermined maximum number of access terminals currently operating in the OOB connected mode on the piconet may be set so that at least one active member address is reserved for use as the open active member address in stage 720.

At stage 725, the identified access terminal may be notified about the WWAN communication. At stage 730, having notified the access terminal about the WWAN communication, the identified access terminal may be directed to operate in the OOB inactive mode, and the active member address used in stage 720 may be recovered. Reserving the active member address may, for example, reduce latencies involved in communicating with inactive ATs 115 according to techniques like those described by the method 700.

Figure 8:
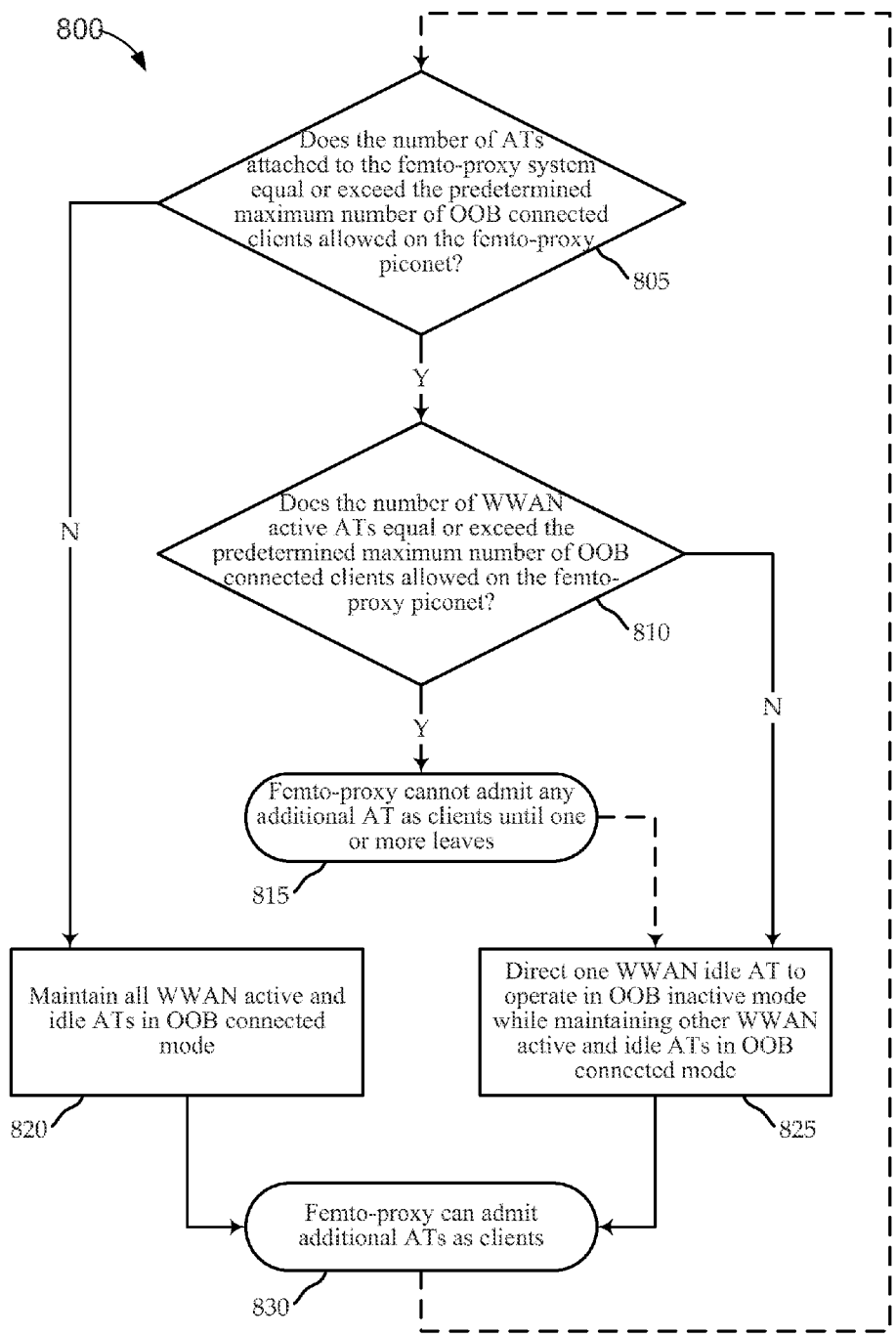
FIG. 8 shows a flow diagram of an exemplary method for minimizing and/or sharing mode-switching penalties in the context of handling extended piconet client sets in this type of context of communications between access terminals and a femto-proxy system.

Other techniques may be used to further reduce latencies (e.g., or other penalties) associated with exploiting multiple OOB and WWAN modes in communications with the ATs 115. FIG. 8 shows a flow diagram of an exemplary method 800 for minimizing and/or sharing mode-switching penalties in the context of handling extended piconet client sets in this type of context of communications between ATs 115 and a femto-proxy system 290. At stage 805, a determination is made as to whether the number of access terminals attached to the femto-proxy system equals or exceeds the predetermined maximum number of OOB connected clients allowed on the femto-proxy piconet. If it is determined at stage 805 that the predetermined maximum number of OOB connected clients allowed on the femto-proxy piconet has not been reached or exceeded, all access terminal clients (e.g., both WWAN active and idle ATs 115 attached to the femto-proxy system 290) may be maintained in OOB connected mode at stage 820. Maintaining the ATs 115 in OOB connected mode whenever possible may minimize inefficiencies associated with activating otherwise inactive clients.

If it is determined at stage 805 that the predetermined maximum number of OOB connected clients allowed on the femto-proxy piconet has been reached or exceeded, a further determination may be made at stage 810 as to whether the number of WWAN active access terminals equals or exceeds the predetermined maximum number of OOB connected clients allowed on the femto-proxy piconet. If it is determined at stage 810 that the number of WWAN active access terminals equals or exceeds the predetermined maximum number of OOB connected clients allowed on the femto-proxy piconet, the OOB femto-proxy will not be allowed to admit any additional access terminals as clients until one or more of the access terminals leaves the piconet (e.g., goes into OOB "park" mode), as indicated by stage 815. If it is determined at stage 810 that the number of WWAN active access terminals is less than the predetermined maximum number of OOB connected clients allowed on the femto-proxy piconet, one of the WWAN idle access terminals may be directed to operate in the OOB inactive mode (e.g., OOB "park" mode) at stage 825, while the other WWAN active and idle access terminals are maintained in the OOB connected mode.

In some embodiments, when the method 800 is operating in stage 815 (i.e., the number of WWAN active access terminals equals or exceeds the predetermined maximum number of OOB connected clients allowed on the femto-proxy piconet), and one of the access terminals becomes inactive (e.g., idle) on the WWAN, the method 800 may proceed to stage 825 by directing the now-idle one of the WWAN access terminals to operate in the OOB inactive mode. Having maintained all active and inactive clients in the OOB connected mode according to stage 820, or having directed at least one of the WWAN idle clients to operate in OOB inactive mode according to stage 825, the femto-proxy will be operating in a state in which it is allowed to admit additional access terminals as clients. As such, the method 800 may return to stage 805 to continue determining how to handle different client access terminals in different states as those states change.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an application specific integrated circuit (ASIC), a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for extending a client set using a femto-proxy architecture, the method comprising:
　receiving a wireless wide area network (WWAN) communication at a femto-proxy system for a designated one of a plurality of access terminals communicatively coupled with the femto-proxy system, the femto-proxy system comprising:
　　a femtocell configured to communicatively couple the access terminals with the WWAN, the access terminals configured to operate on the WWAN in a WWAN active mode or a WWAN idle mode; and
　　an out-of-band (OOB) femto-proxy configured to communicatively couple the plurality of access terminals with a piconet having the OOB femto-proxy designated as a master, the access terminals configured to operate on the piconet in an OOB connected mode or an OOB inactive mode;
　determining, subsequent to receiving the WWAN communication at the femto-proxy system, that the designated access terminal is operating in the OOB inactive mode with an inactive OOB physical communications link between the femto-proxy system and the designated access terminal;
　directing, based at least in part on the receipt the WWAN communication and the determination that the designated access terminal is operating in the OOB inactive mode, the designated access terminal to operate in the OOB connected mode; and
　establishing an active OOB physical communications link between the femto-proxy system and the designated access terminal.

2. The method of claim 1, further comprising:
　delivering the WWAN communication from the femto-proxy system to the designated access terminal over the active OOB physical communications link.

3. The method of claim 1, further comprising:
　determining whether a predetermined maximum number of access terminals is currently operating in the OOB connected mode on the piconet,
　wherein the directing the designated access terminal to operate in the OOB connected mode step is performed when the predetermined maximum number of access terminals is not currently operating in the OOB connected mode.

4. The method of claim 3, further comprising:
　when the predetermined maximum number of access terminals is currently operating in the OOB connected mode:
　　identifying one of the access terminals currently operating in both the OOB connected mode and the WWAN idle mode;
　　directing the identified one of the access terminals to operate in the OOB inactive mode, such that the predetermined maximum number of access terminals is not currently operating in the OOB connected mode; and
　　directing the designated access terminal to operate in the OOB connected mode when the predetermined maximum number of access terminals is not currently operating in the OOB connected mode.

5. The method of claim 1, wherein:
　the predetermined maximum number of access terminals currently operating in the OOB connected mode on the piconet is determined according to a maximum number of addresses available for OOB connected mode access terminals on the piconet.

6. The method of claim 1, wherein:
　the OOB femto-proxy is configured to establish the piconet as a Bluetooth piconet; and
　the OOB inactive mode is a Bluetooth parked mode.

7. The method of claim 6, wherein:
　directing the designated access terminal to operate in the OOB connected mode comprises sending an unpark request from the OOB femto-proxy to the designated access terminal and receiving a response at the OOB femto-proxy from the designated access terminal accepting the unpark request; and
　establishing the active OOB physical communications link between the femto-proxy system and the designated access terminal comprises establishing an asynchronous connection-oriented link logical transport.

8. The method of claim 1, further comprising:
　synchronizing a set of the access terminals operating in the OOB inactive mode during a periodic synchronization window, the set comprising the designated access terminal,
　wherein the designated access terminal is directed to operate in the OOB connected mode during the periodic synchronization window.

9. The method of claim 1, wherein the access terminals are configured to consume lower power when operating in the OOB inactive mode than when operating in OOB connected mode.

10. A femto-proxy system for handling an extended client set, the system comprising:
　a femtocell configured to communicatively couple a plurality of access terminals with a wireless wide area network (WWAN), the access terminals configured to operate on the WWAN in a WWAN active mode or a WWAN idle mode;
　an out-of-band (OOB) femto-proxy, communicatively coupled with the femtocell, and configured to communicatively couple the plurality of access terminals with a piconet having the OOB femto-proxy designated as a master, the access terminals configured to operate on the piconet in an OOB connected mode or an OOB inactive mode; and
　a communications management subsystem, communicatively coupled with the femtocell and the OOB femto-proxy, and configured to:
　　receive a WWAN communication for a designated one of the plurality of access terminals;
　　determine, subsequent to receiving the WWAN communication at the femto-proxy system, that the designated access terminal is operating in the OOB inactive mode with an inactive OOB physical communications link between the OOB femto-proxy and the designated access terminal;
　　direct, based at least in part on the receipt of the WWAN communication and the determination that the designated access terminal is operating in the OOB inactive mode, the designated access terminal to operate in the OOB connected mode; and establish an active OOB physical communications link between the OOB femto-proxy and the designated access terminal.

11. The femto-proxy system of claim 10, the communications management subsystem being further configured to:
deliver the WWAN communication from the femto-proxy system to the designated access terminal over the active OOB physical communications link.

12. The femto-proxy system of claim 10, the communications management subsystem being further configured to:
determine whether a predetermined maximum number of access terminals is currently operating in the OOB connected mode on the piconet,
wherein the designated access terminal is directed to operate in the OOB connected mode step when the predetermined maximum number of access terminals is not currently operating in the OOB connected mode.

13. The femto-proxy system of claim 12, the communications management subsystem being further configured to:
when the predetermined maximum number of access terminals is currently operating in the OOB connected mode:
identify one of the access terminals currently operating in both the OOB connected mode and the WWAN idle mode;
direct the identified one of the access terminals to operate in the OOB inactive mode, such that the predetermined maximum number of access terminals is not currently operating in the OOB connected mode; and
direct the designated access terminal to operate in the OOB connected mode when the predetermined maximum number of access terminals is not currently operating in the OOB connected mode.

14. The femto-proxy system of claim 10, wherein:
the predetermined maximum number of access terminals currently operating in the OOB connected mode on the piconet is determined according to a maximum number of addresses available for OOB connected mode access terminals on the piconet.

15. The femto-proxy system of claim 10, wherein:
the OOB femto-proxy is configured to establish the piconet as a Bluetooth piconet; and
the OOB inactive mode is a Bluetooth parked mode.

16. The femto-proxy system of claim 15, wherein:
the communications management subsystem is configured to direct the designated access terminal to operate in the OOB connected mode by sending an unpark request from the OOB femto-proxy to the designated access terminal and receiving a response at the OOB femto-proxy from the designated access terminal accepting the unpark request; and
the communications management subsystem is configured to establish the active OOB physical communications link between the femto-proxy system and the designated access terminal by establishing an asynchronous connection-oriented link logical transport.

17. The femto-proxy system of claim 10, the communications management subsystem being further configured to:
synchronize a set of the access terminals operating in the OOB inactive mode during a periodic synchronization window, the set comprising the designated access terminal,
wherein the designated access terminal is directed to operate in the OOB connected mode during the periodic synchronization window.

18. A femto-proxy system for handling an extended client set, the system comprising:
a femtocell configured to communicatively couple a plurality of access terminals with a wireless wide area network (WWAN), the access terminals configured to operate on the WWAN in a WWAN active mode or a WWAN idle mode;
an out-of-band (OOB) femto-proxy, communicatively coupled with the femtocell, and configured to communicatively couple the plurality of access terminals with a piconet having the OOB femto-proxy designated as a master, the access terminals configured to operate on the piconet in an OOB connected mode or an OOB inactive mode;
means for receiving a WWAN communication for a designated one of the plurality of access terminals;
means for determining, subsequent to receiving the WWAN communication at the femto-proxy system, that the designated access terminal is operating in the OOB inactive mode with an inactive OOB physical communications link between the OOB femto-proxy and the designated access terminal;
means for directing, based at least in part on the receipt of the WWAN communication and the determination that the designated access terminal is operating in the OOB inactive mode, the designated access terminal to operate in the OOB connected mode; and
means for establishing an active OOB physical communications link between the OOB femto-proxy and the designated access terminal.

19. The femto-proxy system of claim 18, further comprising:
means for delivering the WWAN communication from the femto-proxy system to the designated access terminal over the active OOB physical communications link.

20. The femto-proxy system of claim 18, further comprising:
means for determining whether a predetermined maximum number of access terminals is currently operating in the OOB connected mode on the piconet,
wherein the designated access terminal is directed to operate in the OOB connected mode step when the predetermined maximum number of access terminals is not currently operating in the OOB connected mode.

21. The femto-proxy system of claim 20, further comprising:
when the predetermined maximum number of access terminals is currently operating in the OOB connected mode:
means for identifying one of the access terminals currently operating in both the OOB connected mode and the WWAN idle mode; and
means for directing the identified one of the access terminals to operate in the OOB inactive mode, such that the predetermined maximum number of access terminals is not currently operating in the OOB connected mode,
wherein the designated access terminal is directed to operate in the OOB connected mode when the predetermined maximum number of access terminals is not currently operating in the OOB connected mode.

22. The femto-proxy system of claim 18, wherein:
the predetermined maximum number of access terminals currently operating in the OOB connected mode on the piconet is determined according to a maximum number of addresses available for OOB connected mode access terminals on the piconet.

23. The femto-proxy system of claim 18, wherein:
the OOB femto-proxy is configured to establish the piconet as a Bluetooth piconet; and
the OOB inactive mode is a Bluetooth parked mode.

24. The femto-proxy system of claim 23, wherein:
the means for directing the designated access terminal to operate in the OOB connected mode is configured to send an unpark request from the OOB femto-proxy to the designated access terminal and to receive a response at the OOB femto-proxy from the designated access terminal accepting the unpark request; and
the means for establishing the active OOB physical communications link between the femto-proxy system and the designated access terminal is configured to establish an asynchronous connection-oriented link logical transport.

25. The femto-proxy system of claim 18, further comprising:
means for synchronizing a set of the access terminals operating in the OOB inactive mode during a periodic synchronization window, the set comprising the designated access terminal,
wherein the designated access terminal is directed to operate in the OOB connected mode during the periodic synchronization window.

26. A processor for handling an extended client set, the processor communicatively coupled with a femtocell configured to communicatively couple a plurality of access terminals with a wireless wide area network (WWAN), the processor communicatively coupled with an out-of-band (OOB) femto-proxy configured to communicatively couple the plurality of access terminals with a piconet having the OOB femto-proxy designated as a master, the access terminals configured to operate on the piconet in an OOB connected mode or an OOB inactive mode and to operate on the WWAN in a WWAN active mode or a WWAN idle mode, the processor comprising:
a WWAN communications controller configured to receive a WWAN communication for a designated one of the plurality of access terminals; and
an access terminal controller, configured to:
determine, subsequent to receiving the WWAN communication at the femto-proxy system, that the designated access terminal is operating in the OOB inactive mode with an inactive OOB physical communications link between the OOB femto-proxy and the designated access terminal;
direct, based at least in part on the receipt of the WWAN communication and the determination that the designated access terminal is operating in the OOB inactive mode, the designated access terminal to operate in the OOB connected mode; and
establish an active OOB physical communications link between the OOB femto-proxy and the designated access terminal.

27. The processor of claim 26, the access terminal controller further configured to:
deliver the WWAN communication from the femto-proxy system to the designated access terminal over the active OOB physical communications link.

28. The processor of claim 26, the access terminal controller further configured to:
determine whether a predetermined maximum number of access terminals is currently operating in the OOB connected mode on the piconet,
wherein the designated access terminal is directed to operate in the OOB connected mode step when the predetermined maximum number of access terminals is not currently operating in the OOB connected mode.

29. The processor of claim 28, the access terminal controller further configured to:
when the predetermined maximum number of access terminals is currently operating in the OOB connected mode:
identify one of the access terminals currently operating in both the OOB connected mode and the WWAN idle mode;
direct the identified one of the access terminals to operate in the OOB inactive mode, such that the predetermined maximum number of access terminals is not currently operating in the OOB connected mode; and
direct the designated access terminal to operate in the OOB connected mode when the predetermined maximum number of access terminals is not currently operating in the OOB connected mode.

30. The processor of claim 26, wherein:
the predetermined maximum number of access terminals currently operating in the OOB connected mode on the piconet is determined according to a maximum number of addresses available for OOB connected mode access terminals on the piconet.

31. The processor of claim 26, wherein:
the OOB femto-proxy is configured to establish the piconet as a Bluetooth piconet; and
the OOB inactive mode is a Bluetooth parked mode.

32. The processor of claim 31, wherein:
the access terminal controller is configured to direct the designated access terminal to operate in the OOB connected mode by sending an unpark request from the OOB femto-proxy to the designated access terminal and receiving a response at the OOB femto-proxy from the designated access terminal accepting the unpark request; and
the access terminal controller is configured to establish the active OOB physical communications link between the femto-proxy system and the designated access terminal by establishing an asynchronous connection-oriented link logical transport.

33. The processor of claim 26, the access terminal controller further configured to:
synchronize a set of the access terminals operating in the OOB inactive mode during a periodic synchronization window, the set comprising the designated access terminal,
wherein the designated access terminal is directed to operate in the OOB connected mode during the periodic synchronization window.

34. A computer program product residing on a non-transitory processor-readable medium and comprising processor-readable instructions, which, when executed, cause a processor to perform steps comprising:
receiving a wireless wide area network (WWAN) communication at a femto-proxy system for a designated one of a plurality of access terminals communicatively coupled with the femto-proxy system, the femto-proxy system comprising:
a femtocell configured to communicatively couple the access terminals with the WWAN, the access terminals configured to operate on the WWAN in a WWAN active mode or a WWAN idle mode; and an out-of-band (OOB) femto-proxy configured to communicatively couple the plurality of access terminals with a piconet having the OOB femto-proxy designated as a master, the access terminals configured to operate on the piconet in an OOB connected mode or an OOB inactive mode;

determining, subsequent to receiving the WWAN communication at the femto-proxy system, that the designated access terminal is operating in the OOB inactive mode with an inactive OOB physical communications link between the femto-proxy system and the designated access terminal;

directing, based at least in part on the receipt of the WWAN communication and the determination that the designated access terminal is operating in the OOB inactive mode, the designated access terminal to operate in the OOB connected mode; and establishing an active OOB physical communications link between the femto-proxy system and the designated access terminal.

35. The computer program product of claim 34, the processor-readable instructions, when executed, causing a processor to perform steps further comprising:
delivering the WWAN communication from the femto-proxy system to the designated access terminal over the active OOB physical communications link.

36. The computer program product of claim 34, the processor-readable instructions, when executed, causing a processor to perform steps further comprising:
determining whether a predetermined maximum number of access terminals is currently operating in the OOB connected mode on the piconet,
wherein the directing the designated access terminal to operate in the OOB connected mode step is performed when the predetermined maximum number of access terminals is not currently operating in the OOB connected mode.

37. The computer program product of claim 36, the processor-readable instructions, when executed, causing a processor to perform steps further comprising:
when the predetermined maximum number of access terminals is currently operating in the OOB connected mode:
identifying one of the access terminals currently operating in both the OOB connected mode and the WWAN idle mode;
directing the identified one of the access terminals to operate in the OOB inactive mode, such that the predetermined maximum number of access terminals is not currently operating in the OOB connected mode; and
directing the designated access terminal to operate in the OOB connected mode when the predetermined maximum number of access terminals is not currently operating in the OOB connected mode.

38. The computer program product of claim 34, wherein:
the predetermined maximum number of access terminals currently operating in the OOB connected mode on the piconet is determined according to a maximum number of addresses available for OOB connected mode access terminals on the piconet.

39. The computer program product of claim 34, wherein:
the OOB femto-proxy is configured to establish the piconet as a Bluetooth piconet; and
the OOB inactive mode is a Bluetooth parked mode.

40. The computer program product of claim 39, wherein:
directing the designated access terminal to operate in the OOB connected mode comprises sending an unpark request from the OOB femto-proxy to the designated access terminal and receiving a response at the OOB femto-proxy from the designated access terminal accepting the unpark request; and
establishing the active OOB physical communications link between the femto-proxy system and the designated access terminal comprises establishing an asynchronous connection-oriented link logical transport.

41. The computer program product of claim 34, the processor-readable instructions, when executed, causing a processor to perform steps further comprising:
synchronizing a set of the access terminals operating in the OOB inactive mode during a periodic synchronization window, the set comprising the designated access terminal, wherein the designated access terminal is directed to operate in the OOB connected mode during the periodic synchronization window.

* * * * *